(12) United States Patent
Brandwijk

(10) Patent No.: US 10,105,592 B2
(45) Date of Patent: Oct. 23, 2018

(54) SHAPE-SHIFTING A CONFIGURATION OF REUSABLE ELEMENTS

(71) Applicant: A.Q.B. Venture Capital B.V., Bilthoven (NL)

(72) Inventor: Arie Quirinus Bastiaan Brandwijk, Bilthoven (NL)

(73) Assignee: RND BY US B.V., Bilthoven (NL)

( * ) Notice: Subject to any disclaimer, the term of this patent is extended or adjusted under 35 U.S.C. 154(b) by 341 days.

(21) Appl. No.: 14/052,435

(22) Filed: Oct. 11, 2013

(65) Prior Publication Data

US 2014/0274417 A1 Sep. 18, 2014

Related U.S. Application Data

(63) Continuation-in-part of application No. 13/843,340, filed on Mar. 15, 2013.

(51) Int. Cl.
*A63H 33/04* (2006.01)
*A63F 13/00* (2014.01)
*A63F 9/08* (2006.01)

(52) U.S. Cl.
CPC .......... *A63F 13/00* (2013.01); *A63H 33/042* (2013.01); *A63H 33/046* (2013.01); *A63F 9/083* (2013.01); *Y10T 403/32073* (2015.01)

(58) Field of Classification Search
None
See application file for complete search history.

(56) References Cited

U.S. PATENT DOCUMENTS

| 4,526,372 | A | * | 7/1985 | Kikis | A63F 9/0857 |
| | | | | | 273/153 S |
| 4,608,525 | A | | 8/1986 | Mori et al. | |
| 5,016,540 | A | | 5/1991 | Barber | |
| 5,232,154 | A | | 8/1993 | Jenkins et al. | |

(Continued)

FOREIGN PATENT DOCUMENTS

| EP | 0129853 A1 | 1/1985 |
| GB | 2287045 A | 9/1995 |

(Continued)

OTHER PUBLICATIONS

Rubik's Snake, https://bestofthe80s.wordpress.com/2010/03/22/rubicks-snake; published Jun. 23, 2012.*

(Continued)

*Primary Examiner* — James S McClellan
*Assistant Examiner* — Syvila Weatherford
(74) *Attorney, Agent, or Firm* — Jordan IP Law, LLC; Todd A. Vaughn

(57) ABSTRACT

A system having at least a first, a second and a third three-dimensional element, each element including a center point in the element, and a face with a motion-guiding module, coupled to the center point and defining a trajectory over the element, a motion module, adapted for displacing the center point with respect to a second center point of one of the other elements using the motion-guiding module of that other element, a motion-restriction module, adapted for limiting the displacement of the center point with respect to the second center point to at least one trajectory selected from the group which includes the trajectory and a second trajectory of the other element.

22 Claims, 18 Drawing Sheets

(56) References Cited

U.S. PATENT DOCUMENTS

| | | | |
|---|---|---|---|
| 6,157,872 A | 12/2000 | Michael | |
| 6,241,248 B1 * | 6/2001 | Winter | A63F 9/12 |
| | | | 273/153 S |
| 6,487,454 B1 | 11/2002 | Tymes | |
| 6,520,641 B1 | 2/2003 | Walton et al. | |
| 7,832,729 B2 * | 11/2010 | Park | A63F 3/00214 |
| | | | 273/241 |
| 8,387,989 B2 | 3/2013 | Baum | |
| 2002/0196250 A1 | 12/2002 | Anderson et al. | |
| 2006/0155388 A1 | 7/2006 | Pietrzyk | |
| 2009/0155388 A1 | 6/2009 | Olalde | |
| 2009/0184467 A1 | 7/2009 | Henderson | |
| 2012/0122059 A1 * | 5/2012 | Schweikardt | A63H 33/04 |
| | | | 434/118 |
| 2014/0213140 A1 * | 7/2014 | Goh | G06F 3/002 |
| | | | 446/175 |

FOREIGN PATENT DOCUMENTS

| | | | | |
|---|---|---|---|---|
| WO | WO 9523676 A1 * | 9/1995 | | A63H 33/042 |
| WO | 2004/062759 A1 | 7/2004 | | |

OTHER PUBLICATIONS

Rubiks Snake2—http://folk.uio.no/oisteihh/rubik/snake_patterns_for_extra_long_Rubiks_snakes.html (2014).*

International Preliminary Report on Patentability for International Patent Application No. PCT/NL2014/050154, dated Feb. 27, 2015, 6 pages.

Yosuke Suzuki et al., "Reconfigurable group robots adaptively transforming a mechanical structure—numerical expression of criteria for structural transformation and automatic motion planning method", 2007 IEEE/RSJ International Conference on Intelligent Robots and Systems, Oct. 2007, pp. 2361-2367, San Diego, CA, USA.

Yosuke Suzuki et al., "Reconfigurable group robots adaptively transforming a mechanical structure—Crawl motion and adaptive transformation with new algorithms", 2006 IEEE/RSJ International Conference on Intelligent Robots and Systems, Oct. 2006, pp. 2200-2205, Beijing, China.

Yosuke Suzuki et al., "Self-Reconfigurable Modular Robots Adaptively Transforming a Mechanical Structure: Algorithm for Adaptive Transformation to Load Condition", Journal of Robotics, Oct. 2011, vol. 2011, 13 pages, Hindawai Publishing Corporation, Tokyo, Japan.

T. Fukuda et al., "Communication System of Cellular Robot: CEBOT", 15th Annual Conference of IEEE, Industrial Electronics Society, 1989, vol. 3, pp. 634-639.

T. Fukuda et al., "Dynamically Reconfigurable Robotic System", 1988 IEEE International Conference on Robotics and Automation, 1988, vol. 3, pp. 1581-1586.

T. Fukuda et al., "Self-Organizing Robotic Systems-Organization and Evolution of Group Behavior in Cellular Robotic System", 1994 IEEE Proceedings From Perception to Action Conference, 1994, pp. 24-35.

* cited by examiner

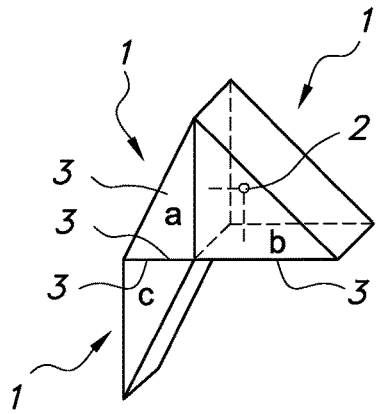
FIG. 1A
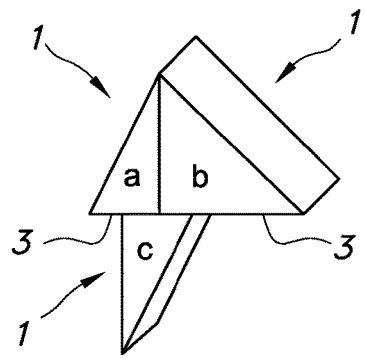
FIG. 1B
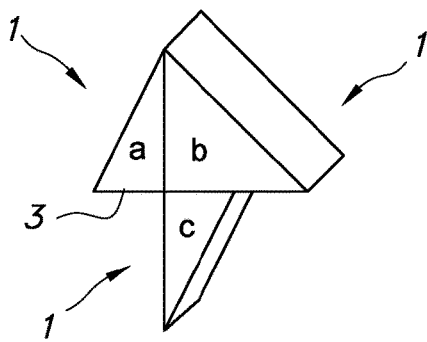
FIG. 1C
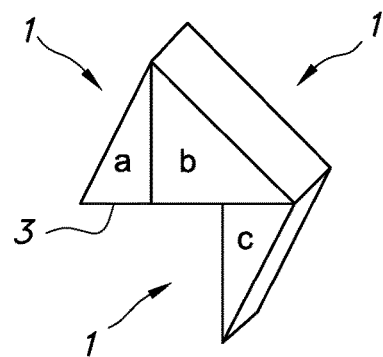
FIG. 1D
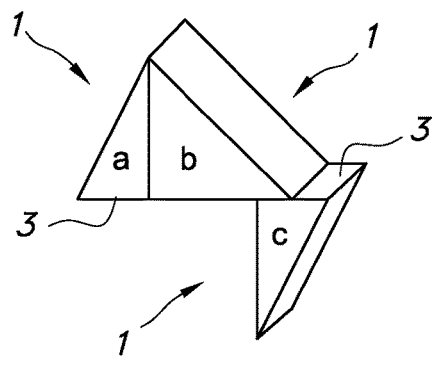
FIG. 1E
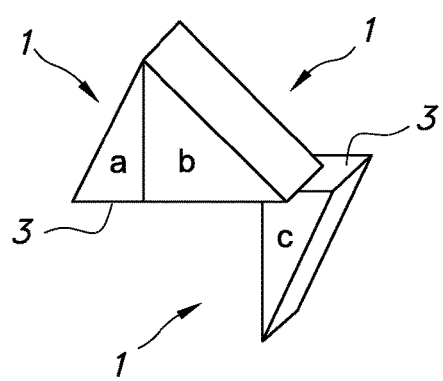
FIG. 1F
FIG. 1

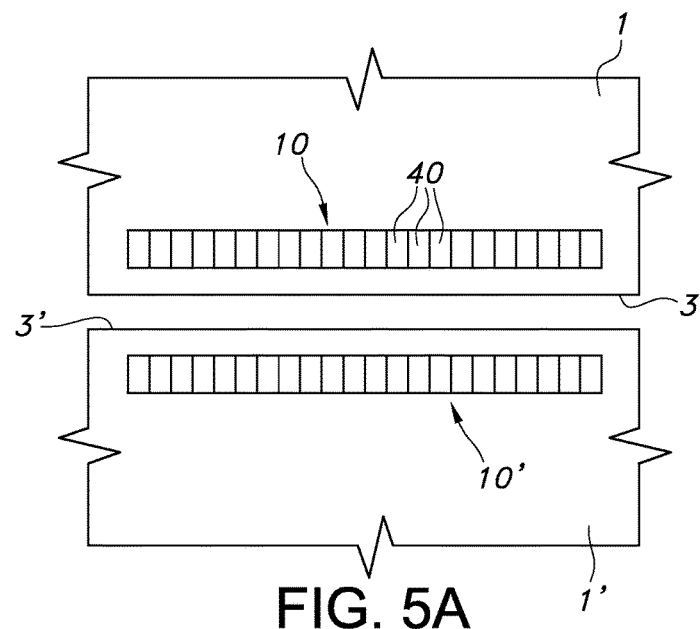
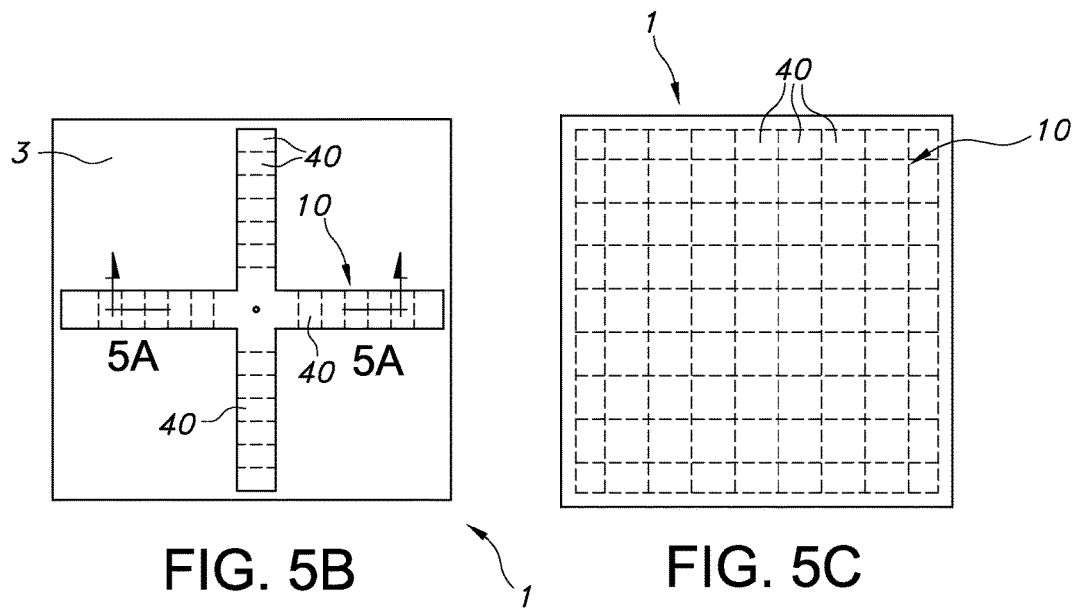
FIG. 5A
FIG. 5B
FIG. 5C

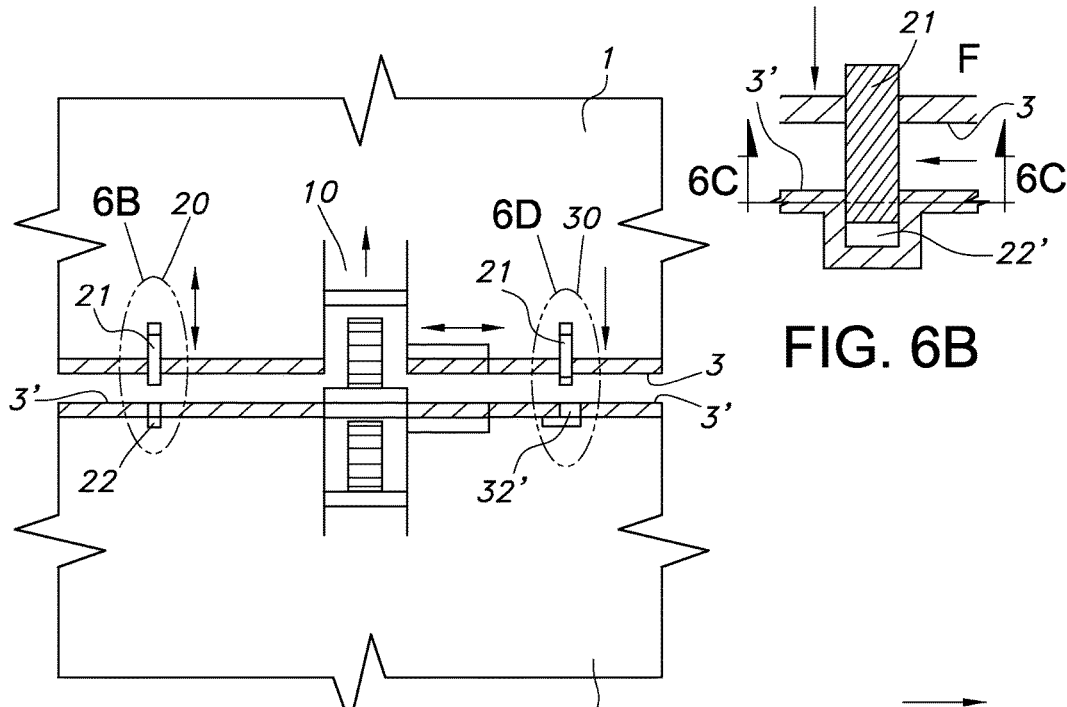
FIG. 6A
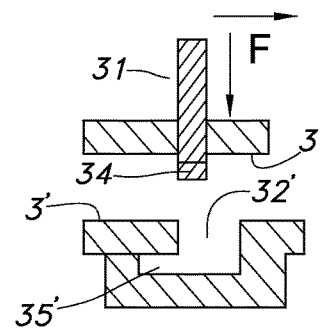
FIG. 6B
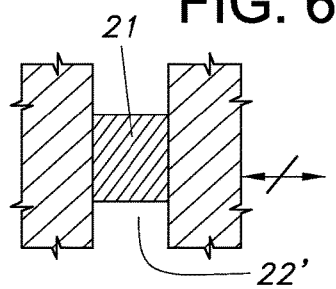
FIG. 6C
FIG. 6D

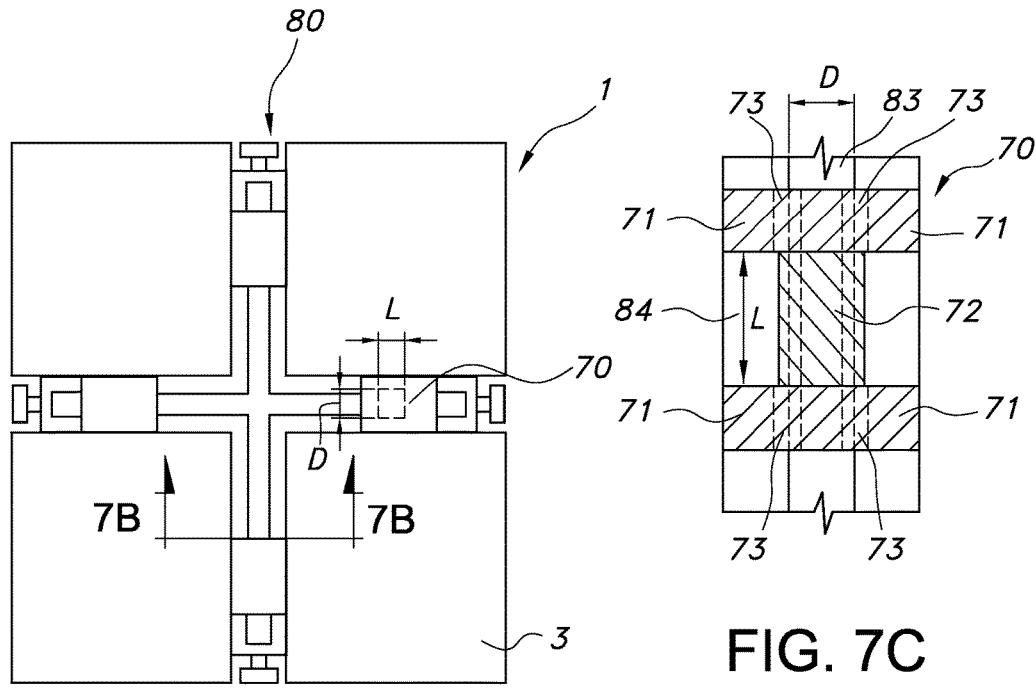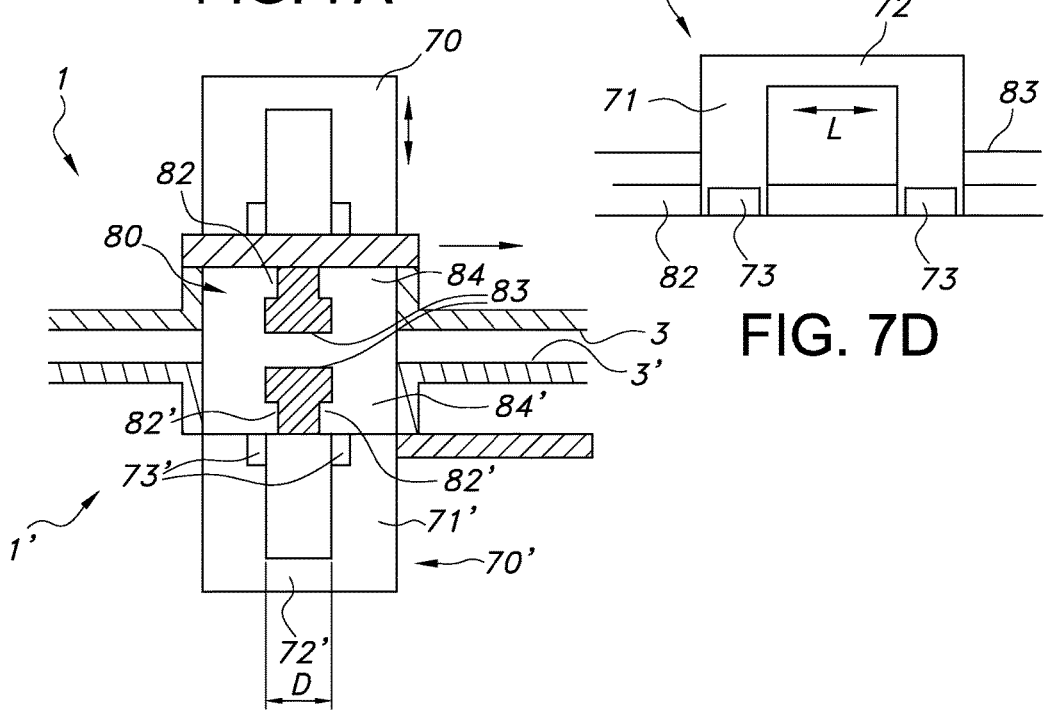
FIG. 7A
FIG. 7C
FIG. 7D
FIG. 7B

SHAPE-SHIFTING A CONFIGURATION OF REUSABLE ELEMENTS

CROSS-REFERENCE TO RELATED APPLICATIONS

This application is a continuation-in-part of U.S. patent application Ser. No. 13/843,340 (filed Mar. 15, 2013), which is hereby incorporated by reference in its entirety.

TECHNICAL FIELD

Embodiments relate to an assembly of elements, and elements suitable and configured for such an assembly.

BACKGROUND

Since the history of man, people are making constructions of all kinds. In order to make constructing easier, a construction was divided into elements. These elements were standardized to make production easier. Examples of this standardisation are, for buildings for instance, bricks for building a house, beams and roof tiles, and more recently concrete parts like floor panels, windows, but also doors and other parts of a building. This concept of standardized parts is also used for other types of constructions, like cars, computers, and, in fact, all industrially produced constructions.

A problem with most of these elements is that they require handling. Furthermore, the elements are used for a specific construction, or a specific use, like toys. Furthermore, often the known elements are not reusable.

In "Reconfigurable group robots adaptively transforming a mechanical structure", by Yousuke Suzuki, Norio Inou, Hitishi Kimura, Michihiko Koseki, Proc. Of the 2006 IEEE/RSJ, Oct. 9-15, 2006, Beijing, China, "group robots adaptively construct a mechanical structure" are described. "The feature of the robots is high rigidity by adopting sliding mechanisms. [.] discussed algorithms of crawl motion and adaptive construction considering mechanical constraints of the robots. The proposed algorithm is based on local communication of the robots. [.]a scheme of a temporary leader which is autonomously specified by form of the structure. The scheme decreases amount of information in communication between the robots." A proposed motion module allows only a limited mobility of the proposed robots.

SUMMARY

Embodiments relate to a system of elements that allow a flexible use.

Embodiments thus pertain to a system comprising at least a first, a second and a third element, and a motion module, said elements being three-dimensional and each element comprising: a centre point in said element; at least one face coupled to said centre point and comprising: a motion-guiding module, defining a trajectory over at least part of said face; a motion-restriction module, adapted for limiting the displacement of said centre point with respect to said centre point of one of the other elements to at least one trajectory selected from the group consisting of said trajectory and said trajectory of said other element, when interacting with said motion module, wherein said motion module is adapted to be coupled to a face of one of said elements, and adapted for displacing said centre point of said one element with respect to said centre point of one of the other elements when interacting with the motion-guiding module of said one of the other elements, said motion-guiding module, said motion module and said motion-restriction module defining different module types, wherein for displacing said centre point of said first element away from said centre point of said second element and towards said centre point of said third element, a first face of said at least one face of said first element faces at least one of a second face of said at least one face of said second element and a third face of said at least one face of said third element, thus providing facing faces, and wherein for said displacing: said motion module interacts with at least one motion-guiding module, and with at least one motion-restriction module, with said facing faces providing said interacting modules while displacing; at least one module of said first face interacts with at least one module of at least one different module type of at least one other of said facing faces while displacing, and said at least one module of said first face interacts with at least one module of a different module type of said second face and at least one module of a different module type of said third face.

It was found that such a system with the elements allow flexible construction of an object. It may even be possible to design the elements within the current definition to group the elements into an object and to change the shape of an object autonomously. In accordance with embodiments, at least one element can be provided with a building plan for the shape. In an alternative embodiment, the building plan can be distributed over elements, and by communicating and distributing control, the elements together may accomplish shifting the shape. A building plan may consist of a definition of the eventual shape of an object. It may alternatively comprise intermediate constellations of elements, or intermediate shapes to arrive to an end shape.

In this description, a configuration is used for an assembly of elements that are grouped together in a substantially consistent orientation with respect to one another. The elements in such a configuration may form an object. For such an object to change its shape, one or more elements move or displace with respect to other elements. This statement, however, does not work the other way around: Elements may have displaced, but that does not always mean that the shape of the object changed. If at least some of the elements of an object displace in a predefined manner, it is possible to in fact have displaced the entire object.

In accordance with embodiments, faces of elements face other faces. In its broadest sense, faces are thus directed to one another. The facing faces may be opposite one another. In accordance with embodiments, facing faces may at least partly overlap.

In accordance with embodiments, faces may be curved. In accordance with embodiments, faces are flat, planar. Thus, a face defines a plane over which In accordance with embodiments a face of another element can slide. In such a state, faces are facing, and during said sliding opposite one another and partly overlapping.

The various modules and parts are 'coupled.' In particular, this relates to functionally coupled. In particular embodiments, this relates to parts or modules that are physically coupled. More in particular, In accordance with embodiments it is used to cover connected. Specifically, In accordance with embodiments parts, faces, modules and the like that are fixed or mounted. In this respect, fixed refers to for instance welding, gluing, and the like. Mounted may refer to the use of attachment provisions, like bolts and nuts.

"Interacting" relates to modules and/or elements that exert force to one another, but also to exchanging data, exchanging instruction program parts, and exchanging feedback. In accordance with embodiments, interacting relates to modules and/or elements that are in contact. In accordance with embodiments, interacting relates to modules and/or elements that are engaging.

Various modules are provided "for displacing." This relates functionally to the process of displacing an element. It can also include preparations for displacing elements. "For displacement" may also include post-processing. It may include, for instance, displacement of one or more motion modules over one or more faces of an element, or between elements, to their actual position on a face where they start displacing an element. It may for instance also include storing a motion module after use, or transmission of an end position to other elements. "For displacing" may for instance also include the time during which data is exchanged in preparation for setting an element in motion.

"While displacing" refers to the time frame during which elements are actually in motion. For displacing elements, multiple instances of "while displacing" may occur.

The faces are provided to allow a face to exert or transmit a force to another face.

A movement of an element can in fact be split into an actual displacement of a centre point of an element, and a change in orientation. A change of orientation is for instance a rotation about a line through the centre point: the centre point does not change its position. In this respect, the motion module of an element is instrumental for an actual displacement of a centre point of an element. An element may further comprise an orientation module for changing the orientation of an element. In accordance with embodiments, the motion module and the orientation module may be combined.

An element may comprise parts defining an outer contour of an element. For instance, an element may comprise ribs. An element comprises a face. A face at least has supports allowing one element to rest on another element. Ribs for instance define such a face. The space between ribs may be open. Alternatively, support may be provided by exerting a force, for instance aerodynamic or electromagnetic forces. In accordance with embodiments, each element further comprising a face provided with a surface at a surface-distance from said centre point. Such a surface provides a solid, physical support. A surface may be completely closed. Alternatively, a face may comprise a surface that has openings. For instance, the surface may be meshed. Often, such a face is planar, defining a bounded plane.

In a sense, the motion module in fact drives the movement of an element with respect to another element.

The motion-guiding module in a sense steers a direction of displacement of an element with respect to another element. In a case when one element is in contact with another element, the motion guiding module may comprise a track on one element and the other element follows that track.

One or more of the elements may further comprise a motion-restriction module adapted for limiting the displacement of said centre point with respect to said centre point of one of the other elements to at least one trajectory selected from the group consisting of said trajectory and said trajectory of said other element, when interacting with the motion module of the other element. The interaction between at least one of the motion module, the motion-guiding module and the motion-restriction module from the face of an element with at least one different module from an element with a facing face may in fact restrict the distance between those elements. It may hold these elements together or release these elements to allow them to move away from one another. It may also keep the distance between these elements between defined limits. In combination and/or in a separate action, the interaction may also keep orientation of these element with respect to one another elements limits. This function occurs while a motion module, a motion-restriction module and a motion-guiding module interact. This may also be the case when elements are not displacing any more. In such a case, modules may still be interacting. This may be referred to as a holding state.

The modules of the current system, in particular the elements, provide a reliable displacement of elements. The result of a displacement is at least partially predictable. Displacement follows at least part of a trajectory. Interaction between on or more motion modules, one or more motion guiding modules, and one or more motion restriction modules limit the displacement of a centre point with respect to one or more other centre points of other elements to at least one trajectory. Such a trajectory may be predefined. It may be a fixed route over a face. For instance a rail provides such a fixed route.

In accordance with embodiments, a system comprises at least a first, a second and a third three-dimensional element, each element comprising: a centre point in said element; a motion-guiding module, coupled to said centre point and defining a trajectory over said element; a motion module, adapted for displacing the centre point with respect to a second centre point of one of the other elements using the motion-guiding module of that other element; a motion-restriction module, adapted for limiting the displacement of said centre point with respect to said second centre point to at least one trajectory selected from the group consisting of said trajectory and a second trajectory of said other element, wherein said motion-guiding modules of at least two of said elements are functionally coupled for enabling said motion module to displace the centre point of a third displacing element which is in contact with one of the other two elements away from the centre point of one of the other two elements and towards the centre point and in contact with the other of the other two elements.

In accordance with embodiments, said first face changes its interacting module for said displacing.

In accordance with embodiments, while displacing, said motion module is coupled to said first face.

In accordance with embodiments, at least one module of said second face and at least one module of said third face interact with a different module of said first face while displacing.

In accordance with embodiments, said modules of said second face and said third face interact one after the other.

In accordance with embodiments, said modules of said second face and said third face interact one after the other with a different module of said first face for said displacing.

In accordance with embodiments, said modules of said first, second and third face interact alternatingly while displacing.

In accordance with embodiments, for said displacing, at least one of said modules from each of said first, second and third face interacts.

In accordance with embodiments, each of said elements comprise a motion module. In particular, each of the elements comprises at least one motion module. This increases flexibility and speed.

In accordance with embodiments, each of said at least one face of said elements comprises a motion module. This again increases speed and flexibility, allowing elements to work for instance autonomously, or in subgroups.

In accordance with embodiments, each element comprises at least two of said faces. With proper orientation of faces of an element with respect to one another, for instance motion in two dimensions and eve three dimensions becomes easier to accomplish.

In accordance with embodiments, said motion module is adapted for changing an orientation of said one element, coupled to said motion module, and an other element, having a face having a module interacting with said motion module, with respect to one another, in particular rotating said face coupled to said motion module and a face facing said face coupled to said motion module with respect to one another, more in particular rotating about an axis through said centre point of said one element.

In accordance with embodiments, at least one of said elements further comprises an orientation module, adapted for changing an orientation of said one element and another of said elements with respect to one another, in particular rotating said face coupled to said orientation module and a face facing said face coupled to said orientation module with respect to one another, more in particular rotating about an axis through said centre point of said one element.

In accordance with embodiments, said motion module is adapted for decoupling from said face.

In accordance with embodiments, said motion module is displaceable when it is decoupled from said face.

In accordance with embodiments, said motion module is displaceable to a neighbouring element when it is decoupled from said face.

In accordance with embodiments, said one element comprises at least two faces, and said motion module is displaceable from one face to a next face of said one element.

In accordance with embodiments, said motion module is displaceable inside said element from one face to another face of said one element when it is decoupled from said face.

In accordance with embodiments, said motion module, said motion restriction module and said motion guiding module comprise a holding state in which at least partially overlapping facing faces are held in their mutual position, said holding state in particular involving at least a motion module from one face and a motion restriction module from a face facing said one face.

In accordance with embodiments, each element comprises a holding module, coupled to a face, for interacting with a holding module of a facing face for holding said face positioned with respect to said facing face. The holding module hold at least one from position and orientation. In accordance with embodiments, the holding module of an element may engage another element. In accordance with embodiments, said holding module comprises two parts, adapted to exert a force to one another for holding elements positioned and/or in their orientation with respect to one another. In accordance with embodiments, one element actuates its first holding module part to engage the second holding module part of another element. In this or another embodiment, the other element may in turn actuate its second holding module part to disengage from the first holding module part of the other element.

In accordance with embodiments, said holding module comprises two parts, adapted to exert a force to one another for holding faces positioned.

In accordance with embodiments, said holding module comprises two parts, adapted to exert a force to one another for holding faces positioned, and wherein said two parts are provided to faces comprising said holding module, allowing each face provided with said holding module to be held in position with respect to a facing face provided with said holding module, with the one holding module part of a face interacting with an other holding part of a facing face.

In accordance with embodiments, said holding module comprises a holding state in which the holding module holds faces positioned, and a released state in which faces can move with respect to one another.

In accordance with embodiments, said at least one face of said each element is connected to said element.

In accordance with embodiments, said motion module is connected to said face.

In accordance with embodiments, the system further comprises a fourth such element comprising at least the features of the first, second and third elements, and providing a fourth of said at least one face to said system.

In accordance with embodiments, for said displacing, said fourth face faces said first face.

In accordance with embodiments, during said displacing said first element displaces in a first direction, and wherein a further, subsequent, displacing comprises: at least one module of said first face interacts with at least one module of at least one different module type of said fourth face while further displacing in a further direction different from said first direction, in particular at an angle to said first direction.

In accordance with embodiments, said first element further comprises a further at least one of said faces, providing a fifth face to said system. For displacing said fifth face may face said fourth face.

In accordance with embodiments, during said displacing said first element displaces in a first direction, and wherein a further, subsequent, displacing comprises: said fifth face facing said fourth face, and at least one module of said fifth face interacts with at least one module of at least one different module type of said fourth faces while further displacing in a further direction different from said first direction during said displacing.

In accordance with embodiments, the motion-guiding module of at least one of said elements is adapted for providing said trajectory functionally around said element.

In accordance with embodiments, said motion-guiding module of said at least one element is adapted for defining a further, second trajectory crossing said predefined, first trajectory. This allows in operation displacement of one of the other elements in two dimensions.

In accordance with embodiments, said elements comprising at least two of said faces, provided with a surface at a surface-distance from said centre point.

In accordance with embodiments, at least part of said motion module is adapted for displacing internally inside said element.

In accordance with embodiments, at least part of said motion module is adapted for changing its orientation inside said element.

In accordance with embodiments, said elements comprise at least two of said faces, said elements neighbouring one another and said motion-guiding modules of said faces connected to one another.

In accordance with embodiments, said faces comprise boundaries, with said motion-guiding modules running to at least one of said boundaries.

In accordance with embodiments, said motion-guiding module comprises a trail of detectable indications, in particular a trail of electromagnetic radiation, like light, a magnetic trail, an electrostatic trail, sound or ultrasound trail. When provided with one or more sensors, the trail can be followed.

In accordance with embodiments, said trajectory comprises a physical track.

In accordance with embodiments, said trajectory comprises a rail. An example of this is for instance a type of rails that a train uses.

In accordance with embodiments, said trajectory at least partly follows a straight line.

In accordance with embodiments, said element comprises at least one face comprising a surface provided with said motion-guiding module.

In accordance with embodiments, said motion-guiding module comprises at least two motion-guiding parts defining a plane.

In accordance with embodiments, two motion-guiding parts have at least one crossing, in particular said motion-guiding parts are straight and cross one another rectangularly.

In accordance with embodiments, said element comprises at least one face comprising a surface provided with said motion module, in particular said surface is a flat plane forming a face of said element.

In accordance with embodiments, said element comprises at least one face comprising a surface provided with said motion module and said motion-guiding module.

In accordance with embodiments, said element comprises a series of faces each having a surface, in particular said faces defining said element.

In accordance with embodiments, said element comprises a series of at least two of said faces, in particular said element comprises a series of coupled faces forming faces of said element.

In accordance with embodiments, said element comprises at least four faces, in particular at least 6 faces, more in particular opposite and having a normal direction orthogonal normal.

In accordance with embodiments, said element is a regular body.

In accordance with embodiments, said element is substantially a block, more in particular a cube. An advantage of cubes is that they allow easy stacking In accordance with embodiments, said motion-restriction module comprises a first motion-restriction module part, arranged for physically engaging another element, and restricting motion in a first direction having a component perpendicular to said trajectory.

In accordance with embodiments, said motion-restriction module comprises a second motion-restriction module part, arranged for physically engaging an other element and restricting motion in a second direction having a component perpendicular to said trajectory and perpendicular to said first direction.

In accordance with embodiments, an element comprises: at least one face comprising an exterior surface for providing abutment for a face of another, similar element; at least one holding module for holding said element with respect to at least one other, similar element, said holding selected from holding position and holding orientation; at least one motion module for moving said element with respect to at least one other, similar element substantially along or on an exterior surface of at least one other, similar element, said moving selected from displacing of a centre of mass with respect to one another, displacing a geometrical centre with respect to one another, and changing an orientation with respect to one another; a communication module for exchanging data with at least one other, similar element, said data comprising at least one position status; a data processing module, functionally coupled to said communication module for processing data from said communication module; an energy module functionally coupled for providing energy to at least said displacement module, said communication module, and said data processing module, wherein said data processing module comprises software which, when running on said data processing module, comprises: retrieving a set position, selected from place and orientation and a combination thereof, for said element via said data communication module; retrieving current position information; producing at least one motion instruction for said motion module for moving said element from said current position to said set position by moving its exterior surface over or along said exterior surface of said at last one other, similar element; providing said motion module with said at least one motion instruction.

In this respect, producing a motion instruction may comprise calculating a motion instruction, or it may comprise calculating intermediate steps. Thus, it may comprise calculating at least one motion instruction for moving said element towards said set position.

In accordance with embodiments, in operation said element is in physical contact with at least one other, similar element with its exterior surface at least partly in contact with at least part of an exterior surface of said at least one other, similar element.

In accordance with embodiments, elements comprise at least one exterior surface and when displacing, the surface displaces substantially parallel to an abutting exterior surface of another, similar element. In accordance with embodiments, the surfaces slide with respect to one another, with for instance an air cushion between the surfaces, or with a small distance for instance using magnetic levitation. An element can thus "hover" over another element.

An element can be characterised by its position and orientation. Both position and orientation may be absolute and relative. The relative position can be defined as a position of an element with respect to one or more other elements. Relative position may also be defined as the position of an element in an object it forms together with other elements, or the position in a group of elements. In accordance with embodiments, elements may be provided with a position sensing part functionally coupled to said data processing module.

In accordance with embodiments said position sensing part comprises a relative position sensing part for sensing the position of said element with respect to at least one other, similar element. Such an element may be in contact with said element.

In accordance with embodiments said position sensing part comprises a local absolute position sensing part for sensing the local position of said element with respect to a location within a group of elements.

In accordance with embodiments said position sensing part comprises an absolute position sensing part for sensing the global position of said element.

In accordance with embodiments an element comprises an orientation-sensing part functionally coupled to data processing module.

In accordance with embodiments, said orientation-sensing part comprises a relative orientation sensing part for sensing the orientation of said element with respect to at least one other, similar element which is in contact with said element.

In accordance with embodiments said orientation-sensing part is adapted for sensing the orientation of said element with respect to a force field, for instance a gravitational force field, an electrostatic force field, a magnetic force field.

In accordance with embodiments said motion module comprises a rail with displacer. In order to actually displace an element with respect to another element, a displacer of one element runs in or on a rail of another element. The displacer may physically engage the rail. Alternatively, it may exert one or more forces to the rail, even without being in physical contact with the rail, like for instance exerting magnetic forces.

In accordance with embodiments said rails runs in at least two dimensions, in particular on/in exterior surface.

In accordance with embodiments, elements may comprise a shared displacer.

In accordance with embodiments said motion module comprises at least one piezo element ("stepper").

In accordance with embodiments said element comprises walls defining the outer boundaries of an element.

In accordance with embodiments, at least one exterior wall may be provided with a seal for sealing space between surfaces of elements. Thus it is possible, using elements, to build a leak-tight, or even an air-tight construction.

In accordance with embodiments said seal has an engaging position and disengaging position.

In accordance with embodiments said seal is circumferential or peripheral with respect to a wall of an element. The seal may comprise parts that run along sides of a wall.

In accordance with embodiments, at least one wall comprises a planar surface part.

In accordance with embodiments, an element comprises at least one functional surface, for instance comprising a photovoltaic element. Alternatively or in combination, a functional surface is provided with one or more display elements. A display element may comprise one or more pixels that may form a display. In accordance with embodiments, the neighbouring surfaces of several elements may form a display. Thus, the elements allow presentation of visual information. Furthermore or alternatively, the functional surface may comprise touch-functionality and/or proximity-sensing, allowing formation of for instance a touch panel. In accordance with embodiments, elements can be combined to form a display for playing movies, television, or games. In case of elements which have sides smaller than 1 cm, the elements will in many instances combine the functional surfaces into one display of combined element-functional surfaces.

In accordance with embodiments, said element comprises a container space in said element, in particular a closable container space.

In accordance with embodiments said container space comprises a closure or an actuator for closing said container. In accordance with embodiments said actuator is functionally coupled to said data processing module.

In accordance with embodiments, said element comprises at least one actuator for selectably operating said motion module, In accordance with embodiments for retracting said motion module within said element. In accordance with embodiments said actuator is functionally coupled to said data processing module.

In accordance with embodiments, said data processing module may comprise any one selected from: a memory, a master-slave setting, a dynamic master slave setting, a building plan, time-based position instructions, a time keeping part.

In accordance with embodiments, the size of the elements is 10 cm down to 0.1 micron, in particular 1 cm down to 0.5 micron, more in particular 1 mm down to 0.5 micron, specifically 100 micron down to 0.1 micron.

Embodiments further relate to a method for conveying material, comprising providing said material in at least one element described above.

Embodiments further relate to an element comprising: at least one exterior surface, for instance a wall, allowing displacement; at least one holding module, for maintaining a position of said element with respect to or onto a similar element; and at least one motion module for displacing said element with respect to other, similar elements substantially over said exterior surface; the motion module can also be a separate part shared with at least one other element, see rail for example, or it can induce linear displacement, rotation, displacing of centre of mass with respect to one another, change of orientation with respect to one another; changing distance of said element with respect to other, similar elements; Furthermore, a telescope part may be provided on the element.

In accordance with embodiments, the element may further comprise: a communication module for exchanging data with other, similar elements; in particular, said data comprising orientation, position with respect to others, fixation, external physical parameters like temperature, sensor data, time, or software or firmware updates, said communication module may be adapted for wireless transmission of data.

In accordance with embodiments, the element may further comprise: a data processing module.

In accordance with embodiments, the element may further comprise: an energy module, for instance for providing energy to said motion module, motion-restriction module, to said communication module, to said data processing module, for instance providing said energy using electromagnetic radiation, wireless transfer, energy from other, similar element, the energy module may also provide storage or energy.

In this respect, "similar" refers to elements comprising at least one face provided with a holding module and a motion module that allows cooperation.

In accordance with embodiments, said elements are in physical contact with one another; in particular, at least parts of said walls or external surfaces are in physical contact with one another. In particular, an area of contact is defined; motion module in contact, holding modules in contact; forces pressing one construction element onto another can be taken up via displacement module, holding module, at least part of said exterior surface.

In accordance with embodiments, elements may be combined in an object, where their position may be defined with respect to the object or with respect to other elements. In this respect, the neighbourhood may be of importance. In accordance with embodiments, the neighbourhood is defined as one beyond said element. In accordance with embodiments, the neighbourhood may be two elements beyond said element.

In accordance with embodiments, an element is at least partly produced using for instance 3D printing. In accordance with embodiments, plant cells may be used for producing a "wood" surface. Such plant cells may be attached to a carrier substrate.

In accordance with embodiments, elements in an assembly of elements work together, wherein said elements have a master/slave setting, in particular a dynamic master/slave setting.

Embodiments further relate to a game assembly, comprising a system described above, and a computing device in communication with at least one of said elements, said computing device running a computer program which, when operating on said computing device, performs: requesting a user input for defining a start configuration of said elements; requesting a user input for defining an end configuration of said elements; communicating said start configuration and said end configuration to at least one of said elements.

Embodiments also relate to a computer implemented construction tool, comprising a computer program which, when running on a computer device, performs: defining in a memory a set of at least three elements, each element comprising: a centre point in said element, a relative position and an orientation; a motion-guiding function, coupled to said centre point and defining a trajectory over said element; a motion function defining displacing the centre point with respect to a second centre point of one of the other elements using the motion-guiding function of that other element; a motion-restriction function, adapted for limiting the displacement of said centre point with respect to the second centre point to at least one trajectory selected from the group consisting of said trajectory and a second predefined trajectory of said other element, wherein said motion-guiding function of at least two of said elements define a functionally coupling between elements for enabling said motion function to displace the centre point of a third, displacing element which is in contact with one of the other two elements away from the centre point of one of the other two elements and towards the centre point and in contact with the other of the other two elements.

In this respect, the construction tool may also be seen as a game, a game, or a simulation, in which features of functional elements are modified and effects of modification may be explored. Other functions may for instance be: sensing other elements; defining in a memory a start configuration of said elements; defining in a memory an end configuration of said elements.

Embodiments further relate to a method for playing a game, comprising providing a computer program which, when running on a computer device, performs: defining a set of at least three three-dimensional elements in a memory, each element having a centre point and at least one face; defining in a memory a start state of said set of elements, by a start outer boundary of said set of elements, and a at least a position of each element with respect to said outer boundary; defining in a memory an goal state of said set of elements, which goal state is different from said start state and requiring displacement of at least one element; providing a function toolbox comprising: a set of motion-guiding functions, said motion-guiding functions coupled to said centre point and defining a trajectory over said element; a set of motion functions defining displacing the centre point with respect to a second centre point of one of the other elements using the motion-guiding function of that other element; a set of motion-restriction functions, adapted for limiting the displacement of said centre point with respect to said second centre point to at least one trajectory selected from the group consisting of said trajectory and a second trajectory of said other element; a set of sensor functions providing information on the environment of an element; presenting said function toolbox to a user and enabling said user to select at least one function from said function toolbox for each element; providing for each element an element computer program operationally coupling said selected functions, and which element computer program when executed collects sensor input, relative position input, and allows motion; running on each element said element computer program.

Again, a game may also be or comprise a simulation as explained above.

In particular, the method comprises providing input regarding the presence of another element in contact with at least one face.

In accordance with embodiments, said method further comprises defining in a memory a goal state of said set of elements by an end outer boundary of said set of elements.

In accordance with embodiments, said method further comprises defining in a memory a goal state of said set of elements by defining for at least one element a requirement with respect to said set of elements.

In accordance with embodiments, said method further comprises defining in a memory a goal state of said set of elements by defining for at least one element a requirement with respect to at least one element of said set of elements.

In accordance with embodiments, said method further comprises defining in a memory a goal state of said set of elements by defining for at least one element a requirement with respect to at least one specific element of said set of elements.

The behaviour of an element In accordance with embodiments has a factor of randomness. For instance a selection of a direction of motion may comprise a factor of randomness. In accordance with embodiments, the motion of an element may be based upon a genetic algorithm. In an example, a random generator influences the selection of for instance the direction of motion. In case such a random selection has a good effect, for instance it brings an element closer to a final goal, a value of a weight factor associated with the direction is increased. If the random selection has a bad effect, the value of the weight factor is decreased.

In a broader sense, the behaviour of an element may at least partly be controlled, or problems that an element or an assembly or system of elements face may be solved, using an evolutionary algorithm. An element in this embodiment comprises a controller comprising machine instructions using an evolutionary algorithm. An evolutionary algorithm generates solutions to optimization problems using techniques inspired by natural evolution. A genetic algorithm in fact is a type of an evolutionary algorithm. Further examples of evolutionary algorithms are inheritance, mutation, selection, and crossover. An evolutionary algorithm uses for instance mechanisms inspired by biological evolution, such as reproduction, mutation, recombination, and selection. Many of these algorithms and mechanisms have a factor of randomness or chance: A property or a choice that needs to be made can at least partly be based upon a random selection. In this way, solutions and operational modes may be found that provide a better solution to a problem.

Due to changes in the environment of elements and/or a vast amount of options, an exact solution or even an optimal solution, and/or for instance a statistical probability that a solution may reach an end goal, may not always be calculated within an available time frame. When for instance one element changes its position, a calculation at/of another element may become invalid.

Similar techniques, similar to evolutionary algorithms, differ in the implementation details and the nature of the particular applied problem. As such, these techniques are known in the art of computer software development. An element, at least part of the elements, or an assembly of elements may use the following algorithms or combinations thereof:

Genetic algorithm: Elements may use it for solving a problem, for instance in the form of strings of numbers (traditionally binary, although the best representations are usually those that reflect something about the problem being solved), by applying operators such as recombination and mutation (sometimes one, sometimes both).

Genetic programming: Elements may use it for making their control instructions more flexible. Effectiveness of for instance parts of computer programs in solving a problem is evaluated, and their fitness is determined by their ability to solve a (computational) problem.

Evolutionary programming: Usually, the structure of a computer program is fixed and its numerical parameters are allowed to evolve.

Gene expression programming: —Like genetic programming, GEP also evolves computer programs but it explores a genotype-phenotype system, where computer programs of different sizes are encoded in linear chromosomes of fixed length.

Evolution strategy—Works with vectors of real numbers as representations of solutions, and typically uses self-adaptive mutation rates.

Memetic algorithm—It is the hybrid form of population based methods. Inspired by the both Darwinian principles of natural evolution and Dawkins' notion of a meme and viewed as a form of population-based algorithm coupled with individual learning procedures capable of performing local refinements.

Differential evolution—Based on vector differences. Elements may use it for solving numerical optimization problems.

Neuro-evolution—Similar to genetic programming but the genomes represent artificial neural networks by describing structure and connection weights. The genome encoding can be direct or indirect.

Learning classifier system is a machine learning system with close links to reinforcement learning and genetic algorithms. It for instance comprises a population of binary rules on which a genetic algorithm altered and selected the best rules. Rule fitness may be based on a reinforcement learning technique.

The elements or assembly of element may also use so called Swarm algorithms, including:

Ant colony optimization—Based on the ideas of ant foraging by pheromone communication to form paths. Elements may use this when confronted with combinatorial optimization and graph problems.

Bees algorithm is based on the foraging behaviour of honey bees. When elements face problems like routing and scheduling.

Cuckoo search is inspired by the brooding parasitism of the cuckoo species. It also uses Lévy flights. Elements may use the algorithm global optimization problems.

Particle swarm optimization—Based on the ideas of animal flocking behaviour. Elements may use this algorithm for numerical optimization problems.

Other population-based meta-heuristic methods comprise:

"Firefly algorithm," inspired by the behaviour of fireflies, attracting each other by flashing light. This is especially useful for multimodal optimization.

Harmony search—Based on the ideas of musicians' behaviour in searching for better harmonies. This algorithm is suitable for combinatorial optimization as well as parameter optimization.

Gaussian adaptation—Based on information theory. Used for maximization of manufacturing yield, mean fitness or average information. See for instance Entropy in thermodynamics and information theory.

It was found that a deterministic set of instructions defining for an element its actions does not always work: Sometimes, due to changes of and in the environment and the number of options that are possible, a 'best solution' of actions to achieve a goal does not exist, or may take too long to calculate. For instance, calculations in one element may become invalid when another element changes its position or orientation. Alternatively, one or more subsets of actions may be defined to accomplish intermediate goals.

Embodiments further relate to a system comprising at least a first, a second and a third three-dimensional element, each element comprising: a centre point in said element; a motion-guiding module, coupled to said centre point and defining a trajectory over said element; a motion-restriction module, adapted for limiting the displacement of said centre point with respect to the second centre point to at least one trajectory selected from the group consisting of said trajectory and a second trajectory of said other element; a motion module, adapted for displacing the centre point of an element with respect to a second centre point of one of the other elements, said motion module adapted for engaging the motion-guiding module of at least one of the element, wherein said motion-guiding modules of at least two of said elements are functionally coupled for enabling said motion module to displace the centre point of a third, displacing element which is in contact with one of the other two elements away from the centre point of one of the other two elements and towards the centre point and in contact with the other of the other two elements.

In accordance with embodiments, said motion module, also referred to as a shared motion module, can move along an element from one face to another. At a face, or a position on a face, the shared motion module can functionally perform its function of motion module. When moving along an element from one face to another, the centre point of an element may remain at rest. In accordance with embodiments, the shared motion module can even travel from one element to a next element, in particular a neighbouring element.

The shared motion module In accordance with embodiments engages the motion guiding module. It thus uses provisions in or on an element that are already present. If, for instance, the elements are provided with tracks, motion guiding module engagement parts of the shared motion module may engage the motion guiding module. Such a motion guiding module may for instance be provided below the surface of a face of the element, like for instance a flush-mounted track. This allows a shared motion module to displace below the surface of a face of an element.

In order to be able to displace one element with respect to at least one other element, the shared motion module may comprise a releasable attachment part for attaching the shared motion module to an element. Releasing the attachment part allows the shared motion module to displace with respect to an element, and activating the attachment part keeps the shared motion module attached to an element. The attachment part of the shared motion module may engage an element, for instance by exerting a force, like a magnetic force. Alternatively, the attachment part may physically engage the element. A mechanical attachment part can cooperate with cooperating attachment parts provided in the element. For instance, the shared motion module may comprise an anchoring pin locking into an anchoring hole in an element, or vice-versa, the shared motion module can be provided with the anchoring hole.

In order to be able to displace an element, the shared motion module may comprise an element displacement part. Such an element displacement part engages a motion guiding module on an other element. Often, the other element is an element which is in face contact with an element that (temporarily) houses the shared motion module. The element displacement part exerts a displacing force on a motion guiding module of another element. This can be a mechanical force, for instance from a wheel running in a track, a gear wheel running on a rack rail, or piezoelectric elements exerting force. Alternatively, for instance a magnetic force may be exerted. Often, the element displacement part extends from a face of an element that is engaged by the shared motion module.

In order to displace along an element, or even move from one element to another, the shared motion module comprises a motion module movement part. This motion module movement part may engage the motion guiding module of the element over of in which the shared motion module is displacing. In accordance with embodiments, the motion module movement part is the element displacement part that is withdrawn to work on the element that employs the shared motion module, or on or within the shared motion module travels. For instance, one or more wheels may extend from the shared motion module in a direction facing away from the element, thus enabling engagement of a neighbouring element. These wheels may be retracted to extend from the shared motion module at an opposite end, allowing engagement of the element using the shared motion module.

An element may comprise one or more storage provisions for storing a shared motion module.

A shared motion module may comprise one or more of the functional parts of an element that are mentioned in this description. A shared motion module may also comprise at least part of one or more of the functional parts of an elements that are mentioned in this description. For instance, a shared motion module may comprise one or more selected form the group consisting of a data processing device, data storage, an energy storage device, energy generating device, a data communication device, and a combination thereof. These devices and or functionalities are already described in relation to an element. This may even allow relatively simple elements only having passive functional parts and shared motion modules having active parts for engaging an element. In accordance with embodiments, an element may comprise at least one motion module that can displace from a functional position at one face to a functional position at another face of an element, Thus, an element may be provided with one or more motion modules, reducing complexity of an element. This no longer requires at least one motion module for each face of an element.

In the current document, reference is made to three dimensional objects or 3D objects. The elements are three dimensional. Thus, simply placing elements together on a plane surface already makes an object three dimensional. A three dimensional object according to the current description, however, refers to an object that is composed of coupled elements and extending at least two elements in each dimensional direction. Such a three dimensional object or 3D object would have at least 4 elements. In fact, three elements might already form a 3D object when one or more elements are out-of-plane with respect to the other elements.

In general, elements may comprise one or more faces that may be defined as being "polar." Suppose that one type of face may be defined as having the property "plus" and another type of face may have the property "minus" with respect to at least one of the motion module, motion restriction module, motion guiding module. Now suppose that a plus face can only couple to and displace over a minus face. When using elements like that, in general ordering of elements with respect to one another becomes important when composing or building an object out of elements. In general formulation, an element comprises at least one face that comprises at least one mirror symmetry with respect to at least one face of another element in view of at least one selected from the motion module, motion guiding module and motion restriction module when facing that other face. These symmetries may be referred to as inter-face symmetry. In accordance with embodiments, the at least one face comprises at least one mirror symmetry with respect to the at least one other face with respect to its shape. Thus, two elements have at least one orientation with respect to one another in which they have a respective face and in which these faces fit on one another, can attach to one another, and move or displace over each others surface. In order to provide flexibility to build an object from elements, In accordance with embodiments an element comprises at least two non-polar faces. In accordance with embodiments, an element comprises less than four polar faces. More in particular, an element comprises less than three polar faces. Specifically, the polar faces are not provided on opposite sides of an element.

On the other hand, elements may comprise one or more faces that have mirror symmetry regarding motion modules, motion restriction modules and/or motion guiding modules in one or more mirror planes normal to the face or faces. Thus, an degree of intra-face symmetry may be provided. When using such elements, for elements to couple such faces or to displace over such faces only requires proper rotational orientation with respect to a rotational axis normal to those faces. When there is mirror symmetry in two perpendicular mirror planes, then coupling becomes even easier. When the respective faces are for instance square and these two mirror planes run through the centre of the square, then two square faces always couple exactly on top of one another. Thus, an increasing symmetry of a face with respect to its motion module and/or its motion restriction module and/or its motion guiding module reduces the need to check rotational orientation of elements with respect to one another. This again increases flexibility when building an object from elements.

In accordance with embodiments, at least one face of an element has mirror symmetry in a mirror plane normal to the face and through the centre of the face. In particular, the face has mirror symmetry in two mirror planes that are normal to one another and the face. In accordance with embodiments, the symmetry of the shape of the face and the symmetry of at least one of the motion module, the motion guiding module and the motion restriction module coincide.

Embodiments further relate to a game comprising shape-shifting an object of elements from a first shape to a second shape, wherein the position of at least one element with respect to at least one other of said elements changes during said shape-shifting.

The elements can in fact form construction elements for assembling a physical structure, for instance a building, a home, or the like. To that end, one or more symmetries of the shape of an element simplifies construction of an object of elements.

The most familiar type of symmetry is geometrical symmetry. A geometric object is said to be symmetric if, after it has been geometrically transformed, it retains some property of the original object.

The most common group of transforms is the Euclidean group of isometries, or distance-preserving transformations, in two dimensional (plane geometry) or three dimensional (solid geometry) Euclidean space. These isometries consist of reflections, rotations, translations and combinations of these basic operations. Under an isometric transformation, a geometric object is symmetric if the transformed object is congruent to the original. For the elements to easily produce an object, In accordance with embodiments the elements is symmetric under at least one isometric transformation.

In accordance with embodiments, the elements have a shape to allow tessellation in at least two dimensions. More formally, a tessellation or tiling is a partition of the Euclidean plane into a countable number of closed sets called tiles, such that the tiles intersect only on their boundaries. These tiles may be polygons or any other shapes. Many tessellations are formed from a finite number of prototiles; all tiles in the tessellation are congruent to one of the given prototiles. If a geometric shape can be used as a prototile to create a tessellation, the shape is said to tessellate or to tile the plane, or, using elements, a space. Certain polyhedra can be stacked in a regular crystal pattern to fill (or tile) three-dimensional space, including the cube (the only regular polyhedron to do so); the rhombic dodecahedron; and the truncated octahedron.

To make stacking and formation of a three dimensional object possible without the need to control orientation of an element, the elements have an identical shape, and have a shape that allows filling a space. In two dimensions, tiling refers to filling a plane with identical Figures or a set of Figures. In the current discussion, elements are three-dimensional and In accordance with embodiments have a shape allowing substantially seamlessly filling a space. This is also referred to as tessellation. In a simple example, identical cubes easily fill a space. In general, for instance polyhedra can be provided that allow filling a space. As such, in mathematics, such shapes are known. A space-filling polyhedron, sometimes called a plesiohedron (Grünbaum and Shephard 1980), is a polyhedron which can be used to generate a tessellation of space. Tessellations in three dimensions are also referred to as honeycombs.

Some literature state that the cube is the only Platonic solid possessing this property (e.g., Gardner 1984, pp. 183-184). There are, however, other identical shapes that allows tessellation. One can simply prove this by cutting a cube in regular pieces. On the other hand or additionally, a combination of tetrahedra and octahedra do fill space (Steinhaus 1999, p. 210; Wells 1991, p. 232). In addition, octahedra, truncated octahedron, and cubes, combined in the ratio 1:1:3, can also fill space (Wells 1991, p. 235). In 1914, Föppl discovered a space-filling compound of tetrahedra and truncated tetrahedra (Wells 1991, p. 234).

There seem to be only five space-filling convex polyhedra with regular faces: the triangular prism, hexagonal prism, cube, truncated octahedron (Steinhaus 1999, pp. 185-190; Wells 1991, pp. 233-234), and gyrobifastigium (Johnson 2000). The rhombic dodecahedron (Steinhaus 1999, pp. 185-190; Wells 1991, pp. 233-234) and elongated dodecahedron, and squashed dodecahedron appearing in sphere packing are also space-fillers (Steinhaus 1999, pp. 203-207), as is any non-self-intersecting quadrilateral prism. The cube, hexagonal prism, rhombic dodecahedron, elongated dodecahedron, and truncated octahedron are all "primary" parallelohedra (Coxeter 1973, p. 29).

In the period 1974-1980, Michael Goldberg attempted to exhaustively catalog space-filling polyhedra. According to Goldberg, there are 27 distinct space-filling hexahedra, covering all of the 7 hexahedra except the pentagonal pyramid. Of the 34 heptahedra, 16 are space-fillers, which can fill space in at least 56 distinct ways. Octahedra can fill space in at least 49 different ways. In pre-1980 papers, there are forty 11-hedra, sixteen dodecahedra, four 13-hedra, eight 14-hedra, no 15-hedra, one 16-hedron originally discovered by Föppl (Grünbaum and Shephard 1980; Wells 1991, p. 234), two 17-hedra, one 18-hedron, six icosahedra, two 21-hedra, five 22-hedra, two 23-hedra, one 24-hedron, and a believed maximal 26-hedron. In 1980, P. Engel (Wells 1991, pp. 234-235) then found a total of 172 more space-fillers of 17 to 38 faces, and more space-fillers have been found subsequently. P. Schmitt discovered a nonconvex aperiodic polyhedral space-filler around 1990, and a convex polyhedron known as the Schmitt-Conway biprism which fills space only aperiodically was found by J. H. Conway in 1993 (Eppstein). Thus, mathematical tessellation is complex. In the current invention, In accordance with embodiments substantial tessellation may already be sufficient. In accordance with embodiments, elements may be provided with sealing provisions that enable filling of remaining spaces between elements.

Elements may be combined into an object by placing elements on top of one another. Elements may also or additionally be held together by allowing at least some of the elements in an object to exert an attracting onto other elements in the object. When combining elements into an object, the elements may be placed substantially on top of one another. Thus, elements may align in three dimensions.

Alternatively, for instance for providing more cohesion, the elements may be combined in a bond. For instance, in two dimensions (in fact, one dimensional), in stretching bond, or another known bond. These bonds are in general known to a skilled person. These bond can also be generalised in three dimensions. Thus, faces can overlap partially in one direction. In the other two directions, elements align. Bonds can also be designed in two directions. Thus, planes of elements are created. Bonds can even be designed in three directions, creating a three-dimensional bond. Faces may, for instance, overlap with only corner parts.

In elements of the current invention, In accordance with embodiments the elements all have the same shape allowing them to substantially fill a space. Gaps may remain. In such instances, elements may be provided with gap-sealing provisions. In accordance with embodiments, to allow elements to displace with respect to one another without help from additional elements, the elements comprise motion modules guiding modules and motion restriction modules on each face.

The above-explained inter-face symmetry and the intra-face symmetry may be combined. Furthermore, these face symmetries may be combined with the shapes mentions above. Thus, face symmetry and shape symmetry may provide an additional flexibility in controlling, displacing, and building objects.

In accordance with embodiments, the motion module, motion guiding module and motion restriction module are designed in such a way that that an element that has two opposite neighbours to move with respect to those neighbours in a direction away from those neighbours while these neighbours maintain their position. In particular, this is the case when the element was at first coupled to its neighbours. Before moving away or displacing, the element detached from the neighbouring elements. More in particular, an element is designed in such a way that it is surrounded by at least four neighbouring elements surrounding the element and at first coupled to the element, to move in a direction away from the neighbouring elements. This is easiest explained based on elements that are block-shaped and have the same size.

Suppose the 9 block-shaped elements form a block object of 3×3 elements. The elements are in face-contact and motion restriction modules couple respective elements of the 9 elements together in such a way that they form one object in the shape of a block. Then there is one centre element that has 4 elements that are in face-contact with the centre element, and there are four 'corner elements'. If the centre element wants or needs to move out of the 3×3 block while the other elements remain coupled and in position, the centre element needs to displace in a direction that is perpendicular to a plane of the object. In such a situation, for instance motion restriction modules of relevant elements may be actuated in such a way that the centre element is no longer coupled to the other elements. Now, motion modules can be actuated to set the centre element in motion.

The elements are for instance symmetrical, for instance having three orthogonal mirror planes. When the elements are block-shaped, easy stacking is possible.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of."

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments described herein are capable of operation in other sequences than described or illustrated herein.

The construction elements herein are amongst others described during operation. As will be clear to the person skilled in the art, embodiments are not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. Embodiments may be implemented by way of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

Additional features described may allow increasing complexity of the system, or may allow elements to function more or less autonomous. Elements may group together to perform tasks, possible by features that all the elements have, or using one or more features that only one or part of the elements have.

Embodiments further relate to construction element or parts thereof comprising one or more of the characterising features described in the description and/or shown in the attached drawings. Embodiments further relate to a method or process comprising one or more of the characterising features described in the description and/or shown in the attached drawings.

The various aspects discussed in this patent can be combined in order to provide additional advantages. Furthermore, some of the features can form the basis for one or more divisional applications.

DRAWINGS

Embodiments will now be described, by way of example only, with reference to the accompanying schematic drawings (which are not necessarily on scale) in which corresponding reference symbols indicate corresponding parts, showing an embodiment of a construction element, and showing in:

FIGS. 1A-1F a perspective view showing several subsequent steps of an example of mutual displacement of three elements.

FIGS. 2A-2E a perspective view of several subsequent steps of another example of mutual displacement of in this case four cube-shaped elements.

FIGS. 3A-3R illustrates a perspective view of several subsequent steps of another example of mutual displacement of in this case 18 cube-shaped elements, and 26 elements, respectively.

FIGS. 4A-4D relate to various possible motion modules, motion guiding modules, motion-restriction modules and combinations thereof.

FIG. 5A-5C show a motion module based upon magnetic forces.

FIG. 6A-6D shows a separate motion module and motion-guiding module.

FIGS. 7A-7D show an alternative combination of motion module, motion-guiding module and motion-restriction module based upon piezo-elements.

DESCRIPTION

Figure 2A:
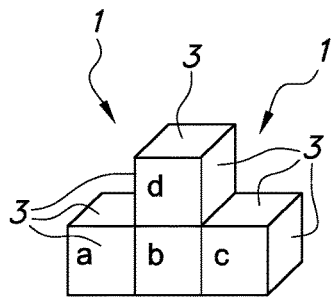

In this detailed description of embodiments, elements have a general reference number 1, and will individually be indicated with letters 'a', 'b', . . . in order to distinguish them from one another. In the discussion, the reference number 1 will be left out when referring to element 'a', 'b', etc. The elements a, b, . . . can be identical. They can also differ in shape or functionality. The elements have a centre 2 (only indicated in element b of FIG. 1A). This centre can in general be a centre of mass (also referred to as "centre of gravity"), or alternatively a geometrical centre (also referred to as "centroid") of an object. If an element has a uniform density, the centre of mass is the same as the centroid.

Each element 1 can have one or more faces 3 that are adapted to allow an element 1 to be positioned on or against another element 1. In particular, the one or more faces 3 can be adapted to allow elements 1 to displace with respect to one another with the surfaces of face 3 in contact or almost in contact. In this detailed description, however, other options will also be demonstrated.

First, some examples of elements and displacement of elements with respect to one another will be demonstrated.

In FIGS. 1A-1F, three elements a, b, and c are of a triangular shape. In this embodiment, each element 1 has at least one face 3 with a surface that allows the elements to be in contact with one another and to displace with respect to one another over the surface of these faces 3. This at least one face 3 of elements 1 thus have a surface 3 that is adapted to allow for an element a, b, c to displace over another element a, b, c. In element b, a centre 2 is indicated. For the discussion, the nature of this centre 2 is not important: A centre 2 has a fixed position in its corresponding element 1.

FIGS. 1A-1F show an example six subsequent steps of element c with respect to elements a and b. Elements a and b remain at the same position and orientation with respect to one another.

In FIG. 1A, starting positions of elements a-c are depicted. Element c starts from a position in which it is in contact with the surface of one face of element a only. Element c starts to move to the right side of the paper. In FIG. 1B, element c is moving to the right and is positioned between elements a and b, and continues to move to the right-hand side of the drawing. In FIG. 1C, element c is no longer in contact with element a, Element c now is in contact with the surface of a face 3 of element b only. Element c continues to move to the right side over the surface of face 3 of element b, and in FIG. 1D it arrives at an end of the surface of face 3 of element b. Element c is able to move on to the right and in FIG. 1E, it arrives at a position depicted. In this position, halve the area of the surface of face 3 contacts the surface of face 3 of element b. Element b now starts moving in a direction into the paper and cross with respect to the earlier direction.

In FIG. 1F, element c is shown in a rest position. In this position, a surface of face 3 is only partly in contact with the surface of face 3 of element b.

In the example of FIGS. 1A-1F, the elements a-c exert forces on one another using the motion modules, motion-guiding modules and/or motion-restriction modules. These forces can be exerted mechanically, using electromagnetic forces, using chemical forces, and any other physical forces, or a combination of these. In case of a chemical force, a potential use of a reversible process which for example does not leave traces on a surface may prolong the usability for future movement along such a surface. When describing the movement phases it must be understood that movement may vary in speed and acceleration. Even an interrupted sequence of move, no move and move again is possible. When moving or not moving, an element may withstand one or more forces exerted upon that element (internal or external) selected from the group consisting of for example gravitational force, mechanical force, electrical force, chemical force and climate forces. A potential use for an element is for example on a different planet, in a fluid or in a vacuum like outer space.

Alternatively, element c is held on elements a and b via a mechanical means or via for instance magnetic force. In this example, the surfaces of the faces 3 of the elements a-c may actually be in contact with one another. Below, various embodiments of motion modules, motion-guiding modules, and motion-restriction modules are illustrated and which may be used for the motion shown in FIGS. 1A-1F.

In the example of FIGS. 2A-2E, four elements 1, indicated a-d, are shown. These elements a-d displace with respect to one another. The elements 1 in this example are identically shaped cubes. In this example, the faces of the cubes are solid surfaces and the cubes rest on each other's solid surface and can be under the influence of a gravitational field. A starting position of the elements a-d is indicated in FIG. 2A. If the displacement action indicated in FIGS. 2A-2E would be repeated, the construction of four elements a-d as a whole moves to the right.

In FIG. 2A, element a starts displacing along a surface of face 3 of element b in an upward direction. Element a thus displaces towards element d. In fact, centre 2 of element a moves away from the centre of element b and gets closer to the centre of element d when it moves in the upward direction.

Figure 2B:
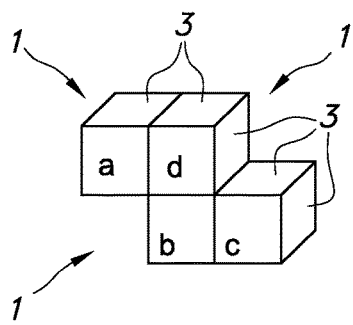

In FIG. 2B, element a arrived at a position closest to the centre of element d. Element a now no longer contacts element b. Now, elements a and d together start displacing to the right side of the paper. This may be done in several ways: Element a may couple to element d, and a motion module of either element d or element b starts acting on element d in the direction of (intended) motion. This results in a motion of elements a and d. When elements a and d displaced so much to the right that a surface of face 3 of element a now contacts part of the face 3 of element b. Now part of a motion module of element a may engage part of a motion module of element b. In such a stage, the combined motion of elements a and d may be caused using the motion module of element a, element b or element d, or combinations of these motion modules.

Figure 2C:
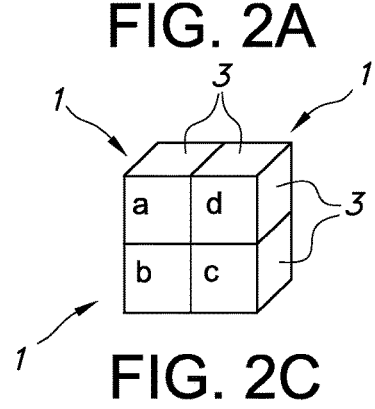
Figure 2D:
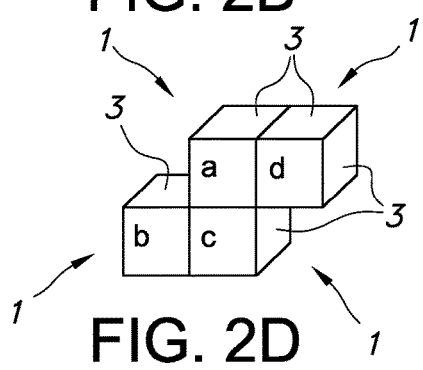

In FIG. 2C, elements a and d are exactly on top of elements b and c. Elements a and d continue to displace together to the right until the situation depicted in FIG. 2D is reached. There, elements a and d stop. Now, element d starts displacing in a downward direction, with its centre moving away from the centre of element a and towards the centre of element c. Again, this motion can be caused by the action of a motion module of element a, of element c or element d, or a combined effort of any of these motion modules.

Figure 2E:
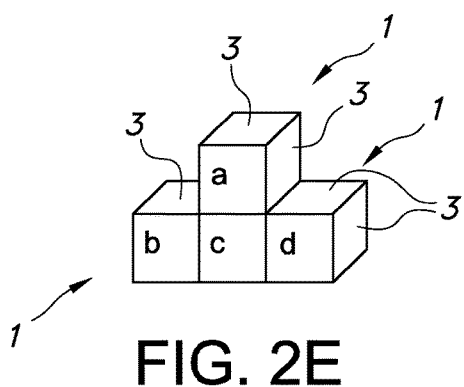

In FIG. 2E, the elements a-d are in fact in a similar external configuration. Thus, in fact the same construction as in FIG. 2A results, but displaced to the right with a displacement which equals the length of a side of an element. Next to having displaced elements a-d another additional aspect of embodiments will be described: transportation. When an object is temporarily coupled to element a, for example placing a basket with material on top or inside element a; element a now uses it's own or the other elements movement ability to transport this other object from one position to another position. Alternatively, an element may comprise a build-in storage space. Thus, the element may functionally be or comprise a container for holding material.

In FIGS. 3A-3H, a construction of 18 elements 1 in fact changes its shape by moving elements with respect to one another. All the elements have an identical shape. The functionality of the elements may differ. Thus, the functionality of the new construction may also differ.

Figure 3A:
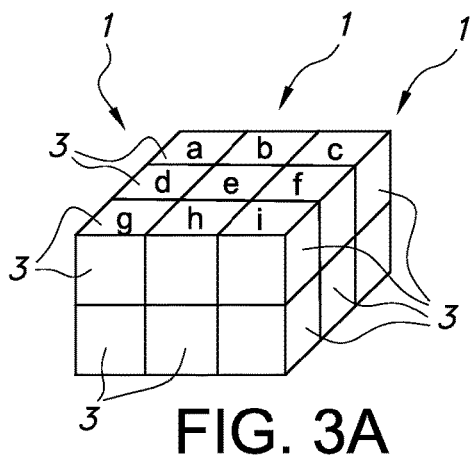
Figure 3B:
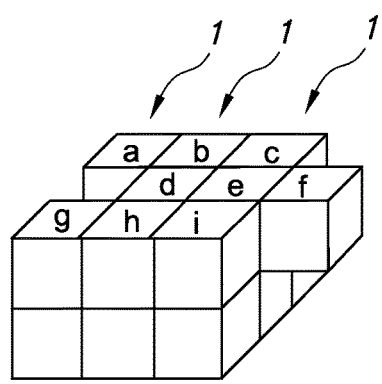
Figure 3C:
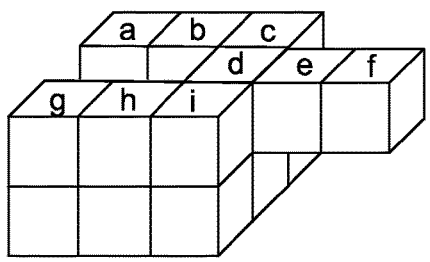
Figure 3D:
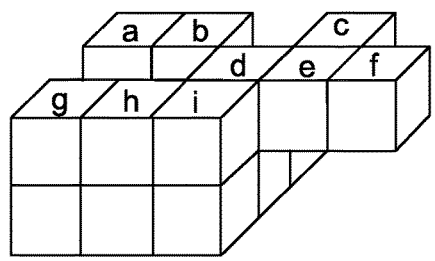
Figure 3E:
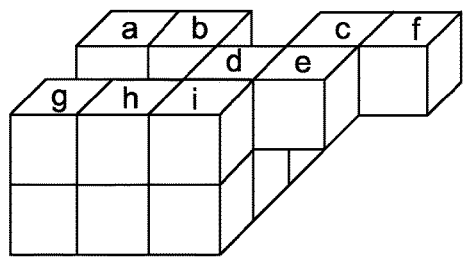
Figure 3F:
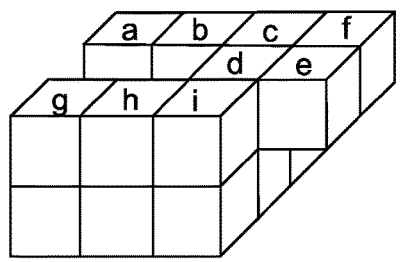
Figure 3G:
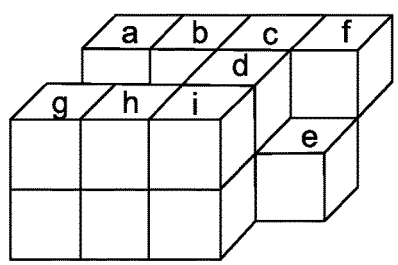
Figure 3H:
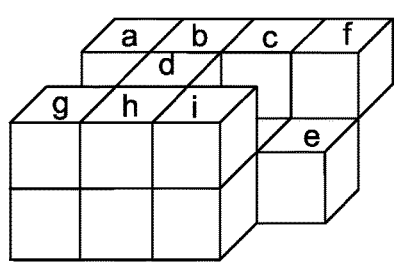
Figure 3I:
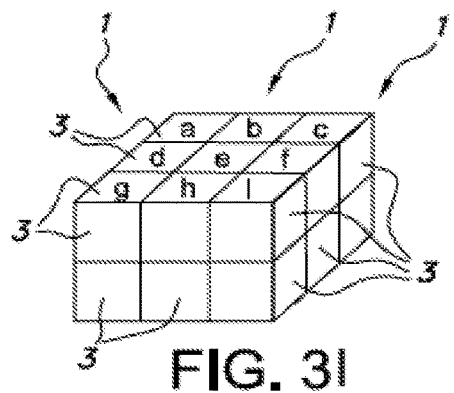
Figure 3J:
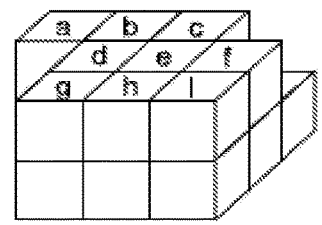
Figure 3K:
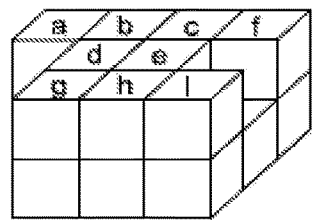

In the arrangement of 18 elements 1, the top 9 elements are indicated a-i. In order to get to a new arrangement of these elements depicted in FIG. 3H, many schemes are possible. FIGS. 3B-3G show several intermediate arrangements of the elements. One of these possible schemes is to first displace the complete row d-f two positions to the left (FIG. 3C), then displace element c to the left until its centre is closest to element e (FIG. 3D), then displace element f in a position where its centre is closest to the centre of element c (FIG. 3E), then displace the elements c and f to the left until elements b and c touch (and may lock) (FIG. 3F). Then displace element e down until it reaches the position shown in FIG. 3G. This can be done using the (or part of the) motion module of element d, f, the element below element d, and element e, or a combined action of a selection of these elements. Next, element d moves to the left until the configuration of FIG. 3H is realized. This scheme thus requires 7 steps, displacing a total of 4 elements (c, d, e, f) a total of 12 positions: when going from FIG. 3A to FIG. 3B, a displacement of three positions occurs, from FIG. 3B to FIG. 3C three positions, from FIG. 3C to FIG. 3D one position, from FIG. 3D to FIG. 3E one position, From FIG. 3E to FIG. 3F two positions, from FIG. 3F to FIG. 3G one position, and from FIG. 3G to FIG. 3H again one position. This adds up to a total of 12 positions. The same end situation or configuration of elements can also be reached in another way. This is shown in FIGS. 3I-3O. First elements a-c are displaced together one step along elements d-f to the left as in FIG. 3J. Subsequently (FIG. 3K), element f is displaced in the direction into the paper until its centre is at its closest position with respect to the centre of element c.

Figure 3L:
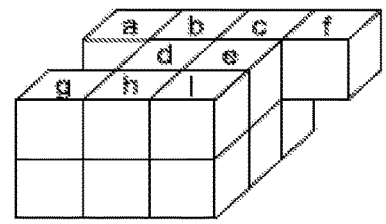
Figure 3M:
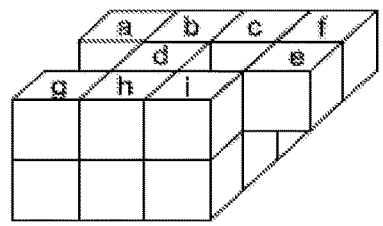
Figure 3N:
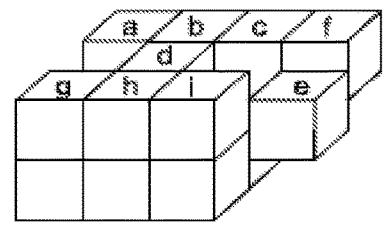
Figure 3O:
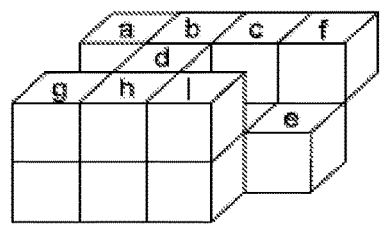

Next, in FIG. 3L elements a-f move as a group one position to the right. Alternatively, a, b, c, f move as one group and d, e move as a second group. Speeds may differ. Next, element e moves to the right (FIG. 3M). FIG. 3N depicts the intermediate position of element e while moving down; in this position element e uses element f and in parallel or sequentially uses the element on the left side of element e. Subsequently the composition of FIG. 3O is again realized. This scheme requires five steps (not counting FIG. 3N), displacing 6 elements (a-f) a total of 12 positions. The last scheme may require a smaller amount of (kinetic) energy, for instance element d has now been displaced only 1 position.

Figure 3P:
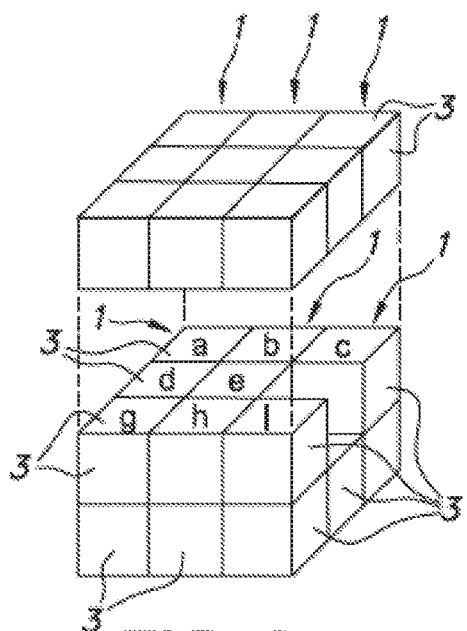
Figure 3Q:
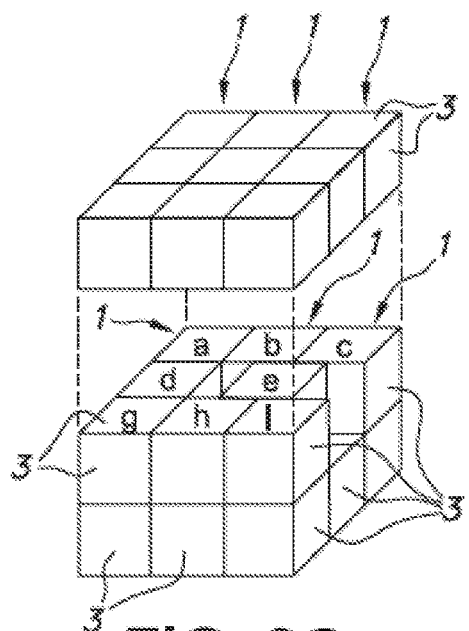
Figure 3R:
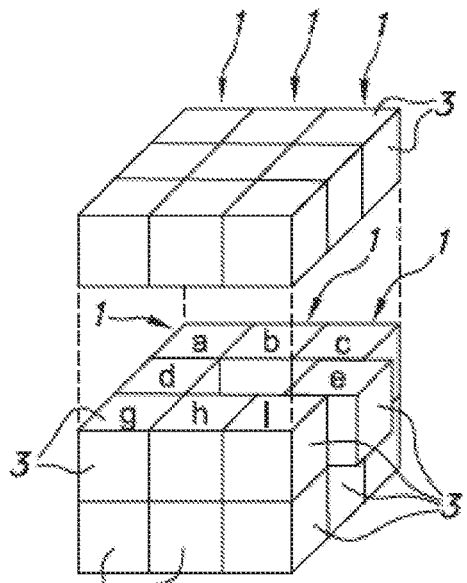

In FIGS. 3P-3R, it is illustrated how an element 1 can move when it is surrounded by other elements 1. Here, in FIG. 3P 26 element 1 are assembled into a single cube, with one free space in the right centre row of elements 1. The 26 elements thus form one object: a cube with one opening. In FIGS. 3P-3R, the top 9 elements 1 are lifted only for illustration purposes. Element 'e' is thus in FIG. 3P in face-contact with 5 other elements 1, including elements 'b', 'd', and 'h'. The motion module, motion guiding module and motion restriction module in this embodiment allows the element 'e' to move to position 3Q and further on to the position indicated in FIG. 3R while the other elements 1 remain at their position. Below, several examples are presented of embodiments of the various modules. These modules, or variations thereof, allow an element (or clusters of elements) that is (are) at several sides enclosed by other elements, to leave an object or displace within an object. In the example of FIGS. 3P-3R, the motion module of element 'e' will use the motion guiding module of at least one of the elements with which it is in 'face contact'. In accordance with embodiments, in order to prevent element 'e' from getting blocked, element 'e' may use the motion modules of all but its faces 3 that are either facing away from a direction of motion, and its face 3 that faces the direction of motion. In a situation where the object is subjected to a gravitational force working in the direction towards the bottom of the drawing, it may be conceivable that only a motion module in/at the lower face (opposite the face that carries the identification 'e') is operative. To get to the position indicated in FIG. 3R, the motion module of element 'e' In accordance with embodiments subsequently uses for instance motion guiding modules of the element 1 directly below element 'e' in FIG. 3P, and/or the element 1 below element 'e' in FIG. 3R, or a combination of the two if possible. Alternatively or in combination, element 'e' may also use motion guiding modules and/or motion modules of elements b, c, h, i if possible. In general, it may use motion guiding modules and/or motion modules of elements in contact with element 'e'.

When comparing end positions and the way that theses end positions are accomplished, several aspects can be taken into account. At a highest level, the performance of the system of elements as a whole may be evaluated. At a lower level, the performance for a group of elements may be evaluated. At the lowest level, the performance of a single element may be the subject of performance evaluation. These aspects for instance may have to do with the (in) equality of elements, element limitations, principles on how to handle forces acting upon an element and inter-element, required intermediate positions, principles used for navigation or problem solving, the speed at which a certain configuration of elements is being reached, energy consumption.

To achieve a certain position fuzzy logic, artificial intelligence, data mining techniques, machine learning, (path finding) algorithms, proportional logic, game theory, or other methods known in the field may be used. Elements may be steered or controlled from one or more central points. Alternatively, elements may be adapted to make their own decisions. In yet another alternative, elements may use distributed control. Thus, several degrees, levels or combinations between being steered or controlled and making own decisions are possible. Thus, an element or a group of elements can operate autonomously, for instance using data or information obtained from other elements and/or other sources. An element can have agent functionality and may learn from the feedback of its environment. An element may investigate, by computation, several potential actions or sequence of actions it is able to make. Subsequently, the element may determine either for itself, or for one or more other elements, which action has the highest benefit to the element, or to one or more other elements. It may then select that action or sequence of actions, and execute that action or sequence of actions. Furthermore, the timing of an action or sequence of actions may be taken into account: Elements may be planning their sequence of actions wherein the planning may take into account actions from other elements, or it may anticipate actions by other elements. Elements may receive only part of the information needed to accomplish a final configuration of elements and therefor need to communicate to other elements or devices. Client-server, master-slave, peer-to-peer, push or pull systems, polling, swarming- or other (hybrid) methods/technology may be used or adapted. Sometimes parallel movement (of individual elements or groups of elements) occurs next to sequential movement. So the movement of element d and element e to their final position could have occurred in one step from FIG. 3F directly to 3H at the same time instead of sequentially as described in the current FIG. 3F followed by 3G (movement of element e) and 3H (movement of element d). Sometimes a certain configuration of elements can only be reached by a method where one element is helping another element. A helper element can temporarily be inserted and used, then retracted from the other elements and thus not have a position in the final configuration of elements at all. Due to the reusability of the elements a large number of configurations of elements can be achieved over time. Well-designed elements do not have to be recycled but can be re-used, even for different purposes. This lowers the burden on our natural environment in several ways. If an element in an object does not function properly or is broke, it may easily be removed, for instance by actions of other elements, and replaced with a functioning element. The element may also be serviced.

A set of elements can assume a first configuration, and then move with respect to one another into a second configuration. Thus, the set of elements together are first in a first shape, and then in a second shape. This is also referred to as 'shape shifting'. In this process, the elements may be reused.

This shape shifting by displacing reusable elements allows for example the formation of a table from a group of elements. When at a later stage this table is not required any longer, at least one element from the group can be instructed to exert some form of control over, or to communicate to, at least one other element of the group. This can be direct, wireless, but may also be accomplished by for instance a messenger element which can be inserted or added and which transfers the message to an element out of the group and then returns. A task of the group of elements may thus comprise changing its current shape, for instance a chair, into a table, and back again into a chair.

Thus, the elements start moving with respect to one another. The constellation of elements that first fulfils the requirements of a chair shifts its shape to a constellation that fulfils the requirements of a table. The constellation of elements can then reorganise itself to fulfil the requirements of a chair according to input given or already available at an element. Thus the task of reusing the elements is executed by the elements.

Interaction with a human being exerting physical control, for example picking up, stacking, or replacing one or more elements, is not needed. This is a different method than building constructions with for instance Lego, in which human interaction is required. It is clear in this example that some form of intelligence or rules regarding mechanics, construction, architecture may be applied by an element or given to an element by a device, such that a person can actually use the chair to sit upon without the chair falling apart due to for instance the disintegration or disconnection of connected elements.

The elements can be physical at various scales. First, their size can vary. Their size may be comparable to playing blocks. Thus, an element may have a cross section of between 1-5 cm. An element may be a building block for constructing a building. In such an instance, a building block may have a cross section of about 5-50 cm. The elements may also be so small that the human eye can hardly discern the individual element. In such an embodiment, an element can have a diameter smaller than 1 mm. In particular, the diameter can be smaller than 100 micron. This may require the use of nanotechnology and for instance molecular or atomic motors. These elements can be used to build parts of this invention, as can larger elements the size of bricks or prefab concrete elements that may form a building. When leaving out the physicality of the elements, the elements can be simulated in order to determine or predict whether a configuration of elements can be achieved. In order to achieve a goal state when starting from a begin or start state, an element may need a combination of a program or app, with functionality which allow some functions to be performed. These functions steer actuators available in an element. Available sensors may give the element or the program input, potentially resulting in a different outcome of a function or a group of functions. These attributes and interactions as such may be known in the field of robotics.

From this a game or simulation, may be construed, which may be using physical or virtual elements or a combination of both. In such a game, it can be the task of a player to select the right program and the right functions/functionalities in order for elements to achieve a certain goal state out of a begin state. This game can be played by a human being alone, or by a computer. It may be played by at least one human being against at least one other human being or against at least one other computer, or a combination thereof.

Specific parameters measure the success; parameters like consumption of energy, speed, amount of moves of an individual element or of the group as a whole, amount of memory/cpu usage, strength of the goal state, or time required to reach the end state. When applying this with a certain degree of autonomy of elements and randomness for example by using artificial intelligence, the outcome may in advance not be known to a player. An overkill of regulating constraints to an element may restrict an elements ability to respond well to other situations/goal states; there may also be a trade-off between specialization and generalization. A player can for instance design on a game device a certain goal state and give certain elements selected properties: a selection from a group of programs, of actuators or motion modules, of sensors, of functions, of energy systems, and of communication systems. It must be understood that these properties of an element may act on other elements or devices. The design can be used by at least one element. The design is provided in part or as a whole to one or more elements and the elements start the displacement and depending upon the given properties the design, actually being a goal state can be accomplished or not. Changing the design allows for the elements to try to achieve another goal position. The elements can be physically or virtually, and displace themselves according to the given properties. Elements may be configured in order for the elements to exchange at least one property or functionality with one another or with another device. Elements may comprise memory in order to recall previous situations or compute potential future situations. This as such is known in the field of computer science. A goal state can be defined in different ways. For instance, the outer boundaries of a set of elements can be used as a goal state. For example, the end shape is a cube, or a plate.

The goal state may be functionally defined at element-level. For example, each element must have at least one face in contact with another element; each element must have at least 2 faces free.

A goal state may also be a list of locations, absolute or relative to other elements, of elements, or for instance specific elements have predefined end positions, again either relative, absolute, or a combination of both.

A goal state may also be represented by a mathematical function, general or mathematical demands or requirements on an assembly of elements, for instance, the assembly or configuration of elements must have a particular plane of symmetry, a hollow space inside, a defined circumference, a defined volume, number of layers, etc.

A goal state may also be functional. Elements having a defined functionality or property are at a certain position. Or the position should be such that the function is optimized. For instance, elements having a photovoltaic face should be located and/or positioned such that their production is maximized. The goal state may even evolve, change or be modified, even during the motions of elements towards the original goal state. The goal state may for instance change due to environmental influences, like day/light rhythm, temperature, etcetera, or may be time-dependent. A goal state may also be a negative definition, or be an exclusion.

Additionally, outside interaction may be possible. For example, inserting or removing an element to or from a certain state. This may be done physically for instance by a human being by using his/her hand. When done by taking into account how elements may attach/interact to one another, an element adjacent to a newly added element may notice/sense this interaction and use this for its own and potentially for other elements' behaviour in the configuration of elements. When going back to the example of designing a goal state on a device, the inserting or removing of at least one element may be taken into account by that device as well. Alternatively, a predesigned goal state may be used.

An example of this is a child designing a castle using the elements. Imagine the child using a computer device. There are many examples of usable devices. For instance a handheld device, such as for instance a handheld device comprising a (touch)screen. An example of such a device comprises a smartphone, an iPad, a smart watch or similar device. These devices may receive user input via a touchscreen, voice control, receiving muscle or nerve input, or other input means.

Suppose a castle is constructed using elements. Physically, the castle formed in a room by action and displacement of the elements themselves. After or during said formation, the child extends the castle by physically adding two more elements. A device may for instance comprise an "app" running on a device like the iPad, which receives information from an element forming part of the castle that the two elements are added. The child may save his/her altered version of the castle. When done playing, the child instructs the elements by means of the app to move to a certain begin state. Such a begin state may be compact so that his/her room may be used for other purposes. This example may then use wireless communication or multiple devices, like for instance multiple iPads, which are used to make a joint configuration of elements even at remote or uninhabited locations (like on planet Mars).

Another goal may be the following. Due to for instance displacement or a change or orientation of one or more elements, conditions may be optimized. For example, the elements may optimize growing conditions for plants. This may be achieved by for instance physically moving one or more plants, providing shade by covering the sun. Two assemblies of elements can displace two plants or groups of plants with respect to one another in such a way that the growing conditions for both plants are optimized. In accordance with embodiments, elements may form a container, for instance a pot, holding the plants. In such a container, one or more elements may for instance provide an opening in the container for allowing excess of water to flow out of the container. Parts of the container may form a sunshade, or the elements may completely move the plant.

Communication may replace a certain type of sensor functionality. An element may use a sensor to detect only its direct neighbour. Alternatively, a sensor may be able to detect another element two positions further, or an element may ask or receive information from an other element if that other element is in contact with the element two positions further. Sensors can use contact/proximity detection by using the electromagnetic or the audio spectrum.

Another example is when two users play a game on for instance two separate devices, for instance on two iPads, two users play a game in which reaching a certain given goal state physical or virtual is the purpose of the game. As described earlier, this can be accomplished by selecting the right properties, functionality or tools for the elements. In this game there may be limits on certain properties or limits on how many different element configurations can be used for a certain goal state when playing a level of that game. An approach akin to the program Minecraft or other virtual worlds can be accomplished with for instance the difference that the current elements may physically build what is virtually designed when using design rules applicable to a physical element.

In FIGS. 4A-7C, various embodiments of motion modules, motion-guiding modules and motion-restriction modules are illustrated. These embodiments are examples showing ways to work embodiments for physical elements 1.

Figure 4B:
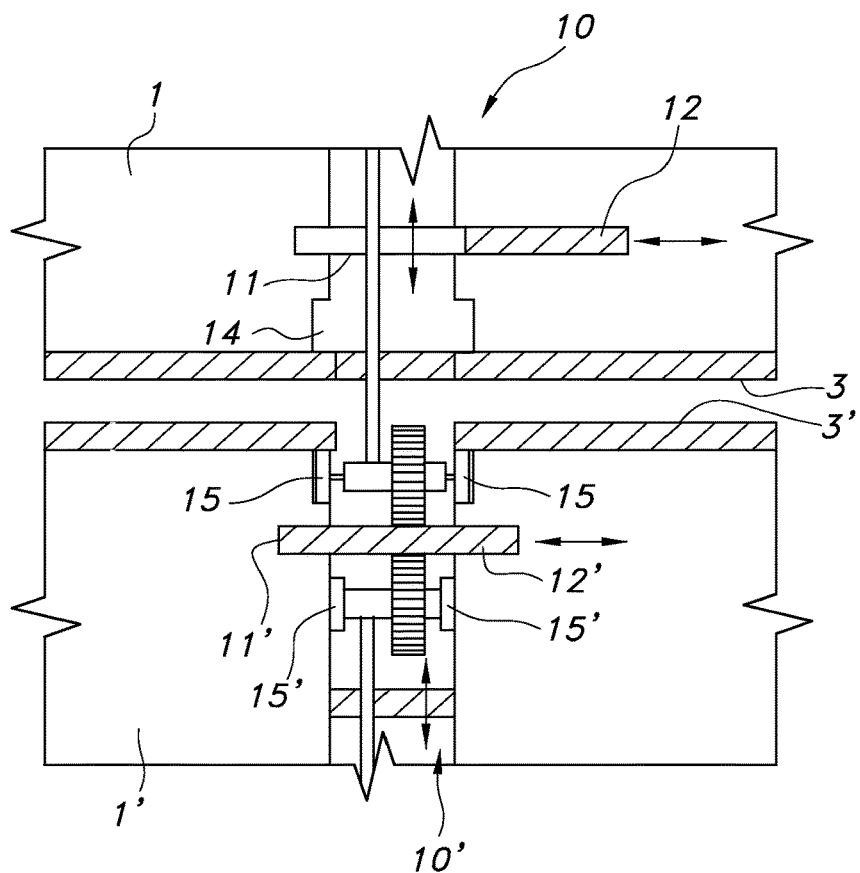
FIG. 4E-4L shows a combined motion module, motion-guiding module and motion-restriction module.
Figure 4A:
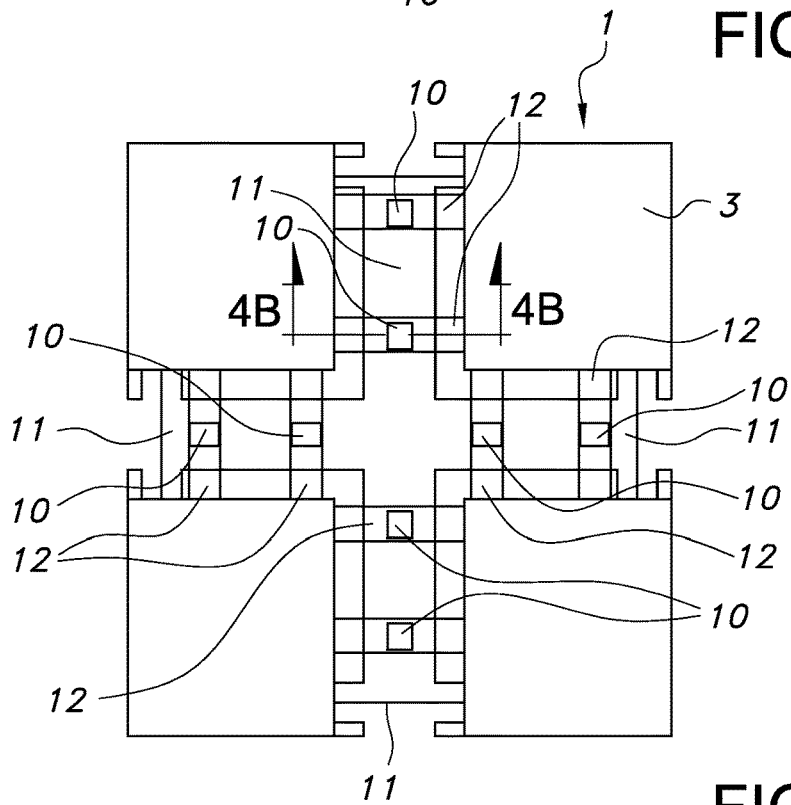
Figure 4C:
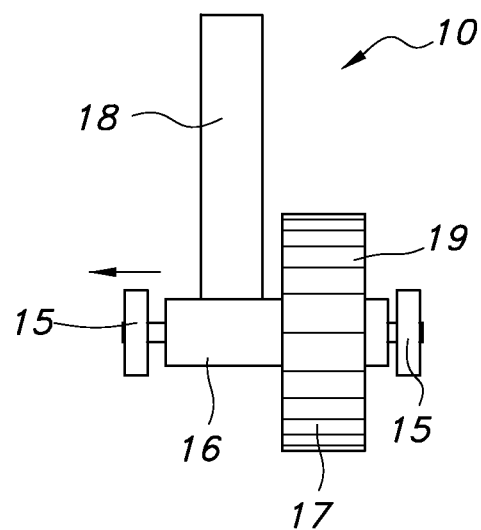

In FIGS. 4A-4C, a cross-sectional view, detail and top view are shown which illustrate a mechanical solution that combines a motion module, a motion-restriction module and a motion-guiding module. In FIG. 4B, a cross section is shown of parts of two elements 1, 1' that are positioned on top of one another. Faces 3 are almost in contact. In fact, if their surfaces have little to almost no friction, the surfaces can in fact be in contact. Otherwise, one of the three modules (motion, motion-guiding and motion-restriction) will cause a little distance between the faces 3.

In the embodiment of FIGS. 4A-4C, an embodiment of part of two elements 1 is schematically shown. Part of the motion module 10 of element 1 is a retractable wheel. Another part of the motion module is the part of track 11 that provides an engagement surface of the tread of the retractable wheel. The track 11 further provides part of the motion guiding module and of the motion restriction module.

Element 1' has in this embodiment the same modules. FIG. 4A shows one element in top view, and FIG. 4B shows a cross section of FIG. 4A as indicated, but with a second element on top of it and also cross sectional view.

In FIG. 4B, the retractable wheel of element 1 extends and engages a motion guiding module of element 1', here track 11' of element 1'. Retractable wheel 10' of element 1' is here in its retracted position. Retractable wheel 10 of element 1 in its extended position engages track 11'. In element 1, in order not to hinder the retractable wheel 10, a slidable cover 12 is in its inactive position. It slides here to the right in the drawing. Element 1' has its slidable cover 12' closed. In this embodiment, the cover 12' together with track 11 provides a continuous track. The track 11 is sunken with respect to the surface or face 3. In FIG. 4C the motion module is shown in more detail. The motion module 10 comprise retractable wheels, comprising a strut 18 coupled to a shaft 16 that is cross with respect to strut 18. In this embodiment, shaft 16 carries wheel 17. A driving motor for the wheel 17 here is an electromotor 19 that can be provided as a rim motor inside wheel 16. Alternatively, the electromotor may be provided in shaft 16. Here at opposite ends of shaft 16, parts 15 of the motion-restriction module are provided that many be extended and retracted in the axial direction of shaft 16. In extended position, it can engage in a groove 14 (FIG. 4B), and in retracted position the motion module 10 can be retracted.

Figure 4D:
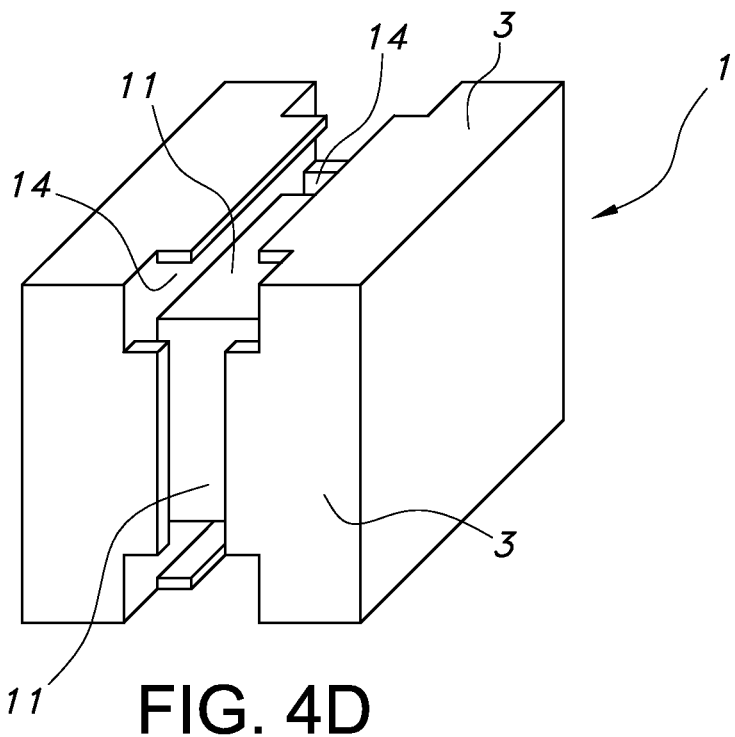

In FIG. 4A, only one face of an element is shown. In accordance with embodiments, of which parts are already discussed above, the element 1 may be a cube. Such a cube can be provided with six similar faces. In fact, the six faces may also be identical. In the embodiment of FIG. 4A, a face carries a cross shaped track. Here, the centre of the cross is located at the centre of the face. In accordance with embodiments, the element may have further faces that are provided with a similar, cross-shaped track. In order for elements to be able to displace with respect to one another in a flexible way, the track on one side functionally connects to the track on another, neighbouring face. In the example of FIG. 4D element 1 has one single, closed, sunken, track that runs all around four sides or faces of the element 1. In this drawing, groove 14 differs from the embodiment of FIGS. 4A and 4B. One of the walls of the groove 14 runs equal with the surface of track 11. In the embodiment of FIG. 4A, the element has at least two tracks. These tracks have two crossings at opposite faces, and in FIG. 4A one of the crossings is visible.

Figure 4E:
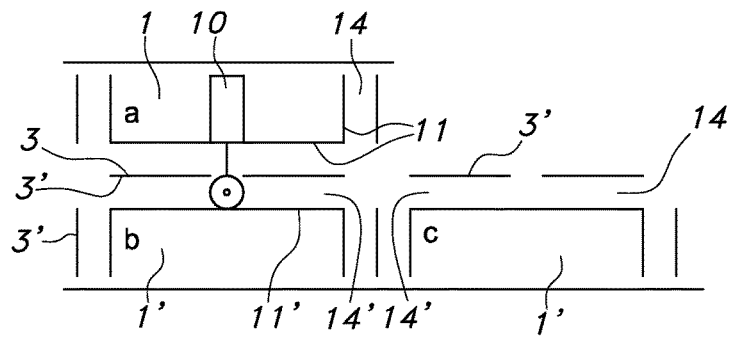
Figure 4F:
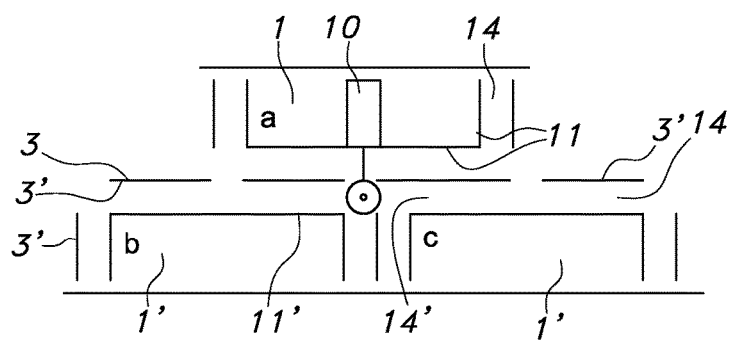
Figure 4G:
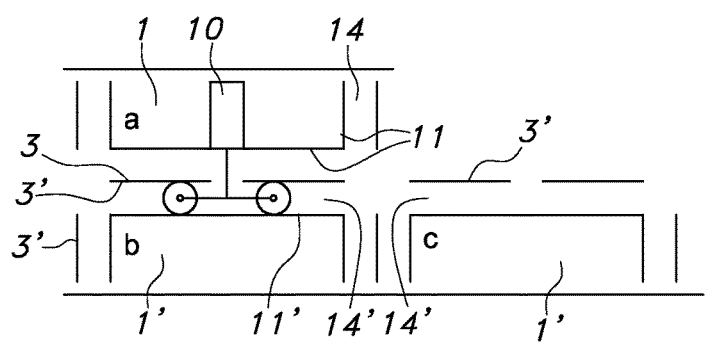
Figure 4H:
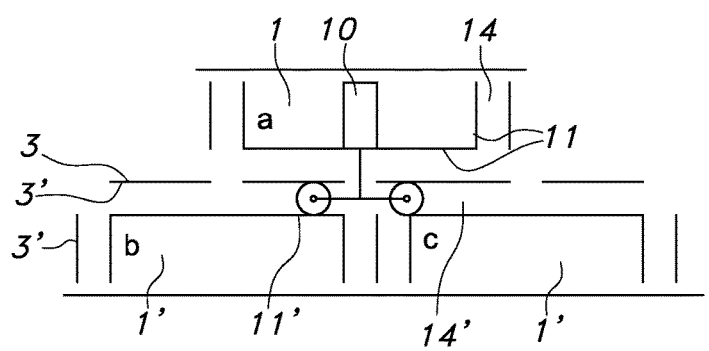

Now suppose two elements 1 of the type shown in FIG. 4A that are positioned with their face in contact. In order for a third element having the wheel as shown in FIG. 4B to move over the face of one element 1 and continue over the neighbouring element 1, A similar neighbouring element must have a similar sunken track at the same level to allow the moving module to traverse the two gaps (each element causing one gap. It may also be seen as one single gap). FIGS. 4E-4L schematically depict 3 elements 1; a, b and c, in a cross-section parallel through the centre of the tracks of the elements. The gaps in the lines resemble the gaps of FIG. 4D of the closed track around the element. FIG. 4E shows that the extended wheel module 10 of element 'a' is running in the track of element 'b'. FIG. 4F depicts the situation where the wheel module 10 tries to traverse the first gap. It is obvious that there is no traction by which the wheel module can displace element 'a' any further in the direction of element c by itself. One or more helper elements 1 attached to element 1 'a' may in this case solve that problem. Potentially the element 1 of FIG. 4D has a different motion module 10: a motion module 10 with multiple wheels (FIG. 4G). First such a motion module 10 extends towards the track. Subsequently the motion module 10 extends its wheel base length and two wheels will be following the track. In this embodiment, a frame connecting both wheel axes extends. The wheels in FIGS. 4G and 4H may have half the width of the single wheel of FIG. 4E. In that way, these wheels if the embodiment of FIGS. 4G and 4H can slide out of one another and fit into the track. The distance between the rotational axes those two wheels is such that the two wheels span the two gaps, which is depicted in FIG. 4H: When one wheel has no traction, the other wheel has traction. The distance between the rotational axes of the two wheels may be set. These two wheels may be jointly or independently of one another use a motorized part.

In another embodiment, multiple motion modules 10 are provided at a certain distance from one another. This allows for movement while one of the motion modules 10 crosses the two gaps and another motion module 10 moves over track 11 (FIG. 4I-4L).

Figure 4I:
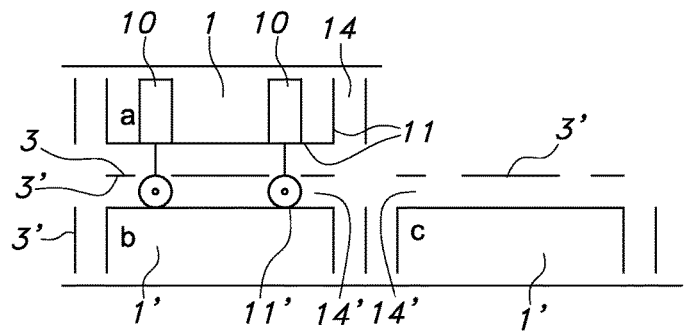
Figure 4J:
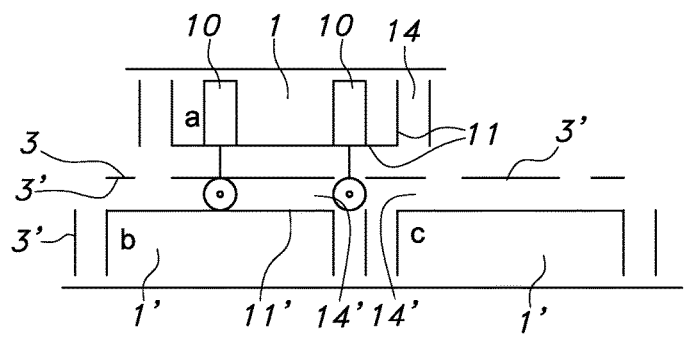
Figure 4K:
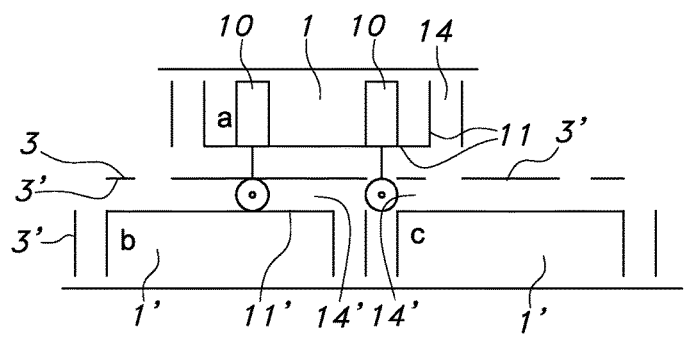
Figure 4L:
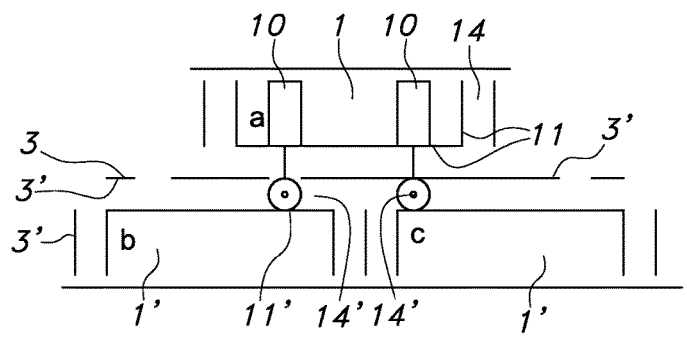

FIG. 4I shows an element 1 having two extended motion modules 10 which are moving element a on element b and towards element c. In FIG. 4J the right wheel has no traction any more, due to the first gap. The left wheel uses its power to continue the displacement of element a. In FIG. 4K the second gap is reached. Still, the left wheel engages element b and pushes element a further towards element c. In the situation of FIG. 4L, both wheels have traction again: with the left wheel engaging element 'b' and the right wheel engaging element 'c'. The wheels may change roles if element 'a' is completely on top of element 'c'.

In the embodiment of a cube-shaped element, in fact three continuous tracks are provided that encircle the cube and that cross one another. Each track usually crosses the other track at two crossings. In fact, more tracks are possible that each have other advantages. In particular, an embodiment will be demonstrated in which one or more tracks can be made over a face at almost each chosen path over the face. In this document, such an embodiment is provided using magnetic parts. Specific other layouts of track that are mentioned here are providing a face with two sets of two tracks. Each set crosses the other set. The tracks of a set can be provided symmetrically with respect to the centre of a face. Thus, in fact the tracks are laid out in the shape of a #-sign. In particular, two sets of parallel tracks are perpendicular with respect to one another. When providing a cross-shaped track an element, in particular when it is a cube, can usually only move on another element when a face of both elements face one another, are parallel to the direction of motion. In particular, these faces are in-plane. Thus, when another motion is required, the help of another element may be needed. An advantage of the cross-shaped track is the relatively simple layout. Furthermore, motion can be provided using a single motion module on each face, at the crossing of a track. Thus, in the embodiment of a cube, six motion modules may be needed to enable full motion capability. In the embodiment of FIG. 4A, each track 11 is provided with four motion modules. This may be needed to provide sufficient traction, supple motion. Other placements of motion modules in the track may be possible, and another number of motion modules per track may be used. In a simple embodiment, already mentioned, one motion module at a crossing of a track may be sufficient under certain conditions.

FIG. 4B shows in schematic cross-section an embodiment in which a motion module 10 is shown in more detail. In this embodiment, a part of the motion module 10 is an extendable driving unit that can move up and down with respect to a face 3, 3'. It can be retracted, leaving the face 3 free, and it can be extended in order to extend beyond the surface of a face 3 and to engage a track 11 of another element.

In this embodiment, many ways can be devised to provide a motion-restriction module. Furthermore, many ways can be found to provide a motion-guiding module. In this embodiment, a mechanical solution is presented. Thus, part of a motion-restriction module and a motion-guiding module are provided using a set of grooves 14 at both sides of track 11. The grooves 14 here provide opposite normal abutments working along a line normal to the face of an element, and opposite transverse abutments working along a line in-plane with respect to a face and cross with respect to the track. In a simple embodiment, the grooves 14 have a rectangular cross section. Here the grooves are parallel to the face, and parallel to track 11. Thus, the grooves 14 together provide part of a motion-restriction module and a motion-guiding module. In fact, grooves 14 can be seem as partly undercut grooves, comprising an undercut at both opposite longitudinal sides of the groove 14.

In this embodiment, another part of a motion-restriction module and a motion-guiding module is realized through parts 15 running in the grooves 14. The parts 15 run in grooves 14 and provide abutments in the grooves 14. The various principles shown here can be combined.

In FIGS. 5A-5C an alternative embodiment for the motion module, motion guiding module and motion restriction module is demonstrated. This embodiment demonstrates an embodiment that avoids mechanical means for realizing a motion module, a motion-guiding module and a motion-restriction module. Parts of a non-mechanical embodiment and a mechanical embodiment may be combined. This embodiment uses magnetic force. To that end, permanent magnets and switchable magnets may be combined.

The following embodiment can be realized in an element. In FIG. 5A, the elements 1, 1' both comprise at least one strip of magnets 40 that can be switched on and off. Thus, the parts in a strip can be selectably activated. In this way, the strips in two elements can together form a distributed linear motor. In fact, the principle of a linear motor as such is known in the art. In this embodiment, such a linear motor is split into two separate parts. This allows the motor to function as a motion module. Using the magnetic force, the opposite strips 10, 10' in two elements that are on top of one another with their strips above one another can even provide at least part of a motion-guiding module.

In this embodiment, additional strips can be provided at the surface of an element. In accordance with embodiments, two strips can be provided in/at a face of an element. These strips can be substantially parallel. Thus, the strips can function as a motion module and a motion-restriction module. In accordance with embodiments, two elements 1, 1' are positioned one on top of the other. Both elements comprise two strips of selectably activatable magnets 40 and that are parallel with respect to one another. The strips of the one element are furthermore substantially parallel with respect to the strips of the other element. Now, if several opposite parts of the strip of two elements that rest on top of one another are actuated in an opposite way, the strips can even provide a motion-restriction module. When activating the parts in one element in an opposite way with respect to parts in the strips of the other element, parts of the strip of one element are poled in one way, for instance north or south, and these parts are opposed by opposite poles, i.e., respectively south or north, of parts of the strip of the other element. Thus, the strips now attract one another. In the embodiment described, a mode is illustrated in which both elements change the polarity of their magnets and cooperate. In an alternative mode of operation, one element can change the polarity of its magnets, while the other element leaves the magnet poles static. The magnetic force of the magnets may be adjustable.

The elements may be provided with at least two strips of magnet parts 40 at or near one face 3 and that are provided substantially in a cross. As such, this is discussed above in a mechanical embodiment. It may also be possible to provide several strips at one face.

The use of selectably switchable magnet parts 40 can even be provided in the following embodiment, providing control over the motion with respect to one another of two elements that rest one on top of the other. In FIG. 5C, an element is provided with a two-dimensional (2D) grid of selectably activatable magnet parts 40 or magnet patches. Magnet parts 40 may be integrated into the surface of a face 3 of an element 1, but may also be provided below the surface of a face 3. When elements 1, 1' are placed one on top of the other with the faces 3, 3' contacting one another, and the magnet parts of the elements are activated in a controlled manner, this can provide a 2D motion module. When opposite magnet parts 40 are activated in an opposite way, the 2D magnet parts 40 that are provided in a grid provides a motion-restriction module. By selectable activating magnet parts 40 in a 2D grind in one element 1 and in the opposite element 1 resting on to of element 1, the magnet parts 40 in both 2D grids interact. When opposite magnet parts are poled oppositely, two elements are attached and stick together. When subsequent magnet parts are activated, the effect of a plane-motor is realized. Subsequently activating magnet parts along a line over a face 3 will move elements 1 with respect to one another along that line. In fact, the 2D magnet parts thus also provide a motion guiding functionality. Faster motion may be achieved by activating groups of magnet parts 40.

The 2D grid of magnet parts 40 and the strip of magnet parts 40 may be combined.

The magnet parts 40 may be provided below a low-friction surface of a face 3. For instance, a polymer material may be used. In particular, PTFE or a similar low-friction polymer material may be used.

In addition to the at least one strip and/or the 2D magnet parts grid, at least one mechanical motion module, motion-guiding module and/or motion-restriction module may be provided. For instance, a mechanical motion-restriction module may be activated to at least temporarily fix the position of two elements with respect to one another in a way that does not require the use of an energy source.

In FIGS. 6A-6D, schematically a mechanical embodiment using a separate motion module 10, a motion-guiding module 20, FIG. 6B in cross section en FIG. 6C in further cross section as indicated in FIG. 6B) and a separate motion-restriction module 30 (FIG. 6D in cross section) is shown.

The motion module comprises a caterpillar track in each element 1, 1'. Caterpillar tracks 10 here engages caterpillar track 10'. In caterpillar track 10, one driving wheels or elements extends in normal direction or face 3 until it engages the caterpillar track 10'. The caterpillar track may be one linear track along a face 3, and alternatively it is a pair of crossing caterpillar tracks laid out like in FIG. 4A.

The motion-restriction module 30 here is an extendable pin 31 that first is activated to extend out into a slot 32 in the opposite element. When pin 31 extends in slot 32, it rotates about its longitudinal axis. Thus, a cam 34 extending from pin 31 in transverse direction is rotated into undercut opening 35' in slot 32'. Can 34 thus hooks into undercut opening 35'. It holds the distance between the elements 1, 1'. This holds element 1 in position with respect to element 1'. In accordance with embodiments, slot 32' is a groove running along face 3 and having an undercut groove 35', thus motion-restriction module keeps the elements on top of one another during motion. Both elements 1 and 1' can both have parts of the motion-restriction module.

Motion-guiding module 20 of element 1 here is a simple, straight pin 21 running in a groove 22' in an opposite element 1'. Thus, a trail along face 3 is defined. In accordance with embodiments and to guide motion even better, the transverse cross section of pin 21 is rectangular, in particular square. It fits in groove 22'.

In FIGS. 7A-7D, yet another alternative embodiment of the motion module, motion-restriction module and motion-guiding module is schematically shown. This embodiment is based upon the use of piezo-elements for realizing parts of the modules mentioned. 'Piezo' is used to refer to an element using the piezoelectric effect. As such, there are principles like linear motors that are suited for application in the elements. In this embodiment, one type will be discussed.

In this embodiment, a rail 80 is provided. Furthermore here four piezo modules 70 are provided. The piezo module is extendible, in FIG. 7B, a cross section as indicated in FIG. 7A shows the piezo module 70 of element 1 in retracted position and piezo element 70' in element 1' also in retracted position. The piezo modules 70, 70' have two U elements that are interconnected by a piezo piece 72. When activated, length L changes and the distance between the U-elements also changes. FIG. 7C shows a top view of a piezo module 70, and FIG. 7D shows a side view of the piezo module 70. The distance D between legs 71 and 71' is such that it fits over the thickened part 83 of rail 80. The inner parts of legs 71, 71', in particular the outer ends, are here provided with clamping piezo elements 73, 73'. When activated, these piezo elements 73, 73' move inward and reduce the space D between legs 71, 71'. Thus, allowing the legs 71, 71' to clamp on the sides of rail 80, in the undercut grooves 82, 82'. Thus, when piezo elements 73, 73' are activated, piezo modules 70, 70' are fixed onto rail 80. Motion of piezo module 70 over rail 80 is possible by subsequent clamping of the U elements. If activation of piezo piece 72 is out of phase with the activation of the U elements, motion is possible.

Thus, here the piezo module 70, 70' together with rail 80 is motion module, motion-restriction module and motion guiding module.

Alternatively, the motion module may be based engaging elements using a hoist, winch, rack and pinion, chain drive, belt drive, rigid chain and rigid belt actuators which all operate on the principle of the wheel and axle. By rotating a wheel/axle (e.g. drum, gear, pulley or shaft) a linear member (e.g. cable, rack, chain or belt) moves. By moving the linear member, the wheel/axle rotates. Thus, elements may be put in motion with respect to one another.

Figure 8:
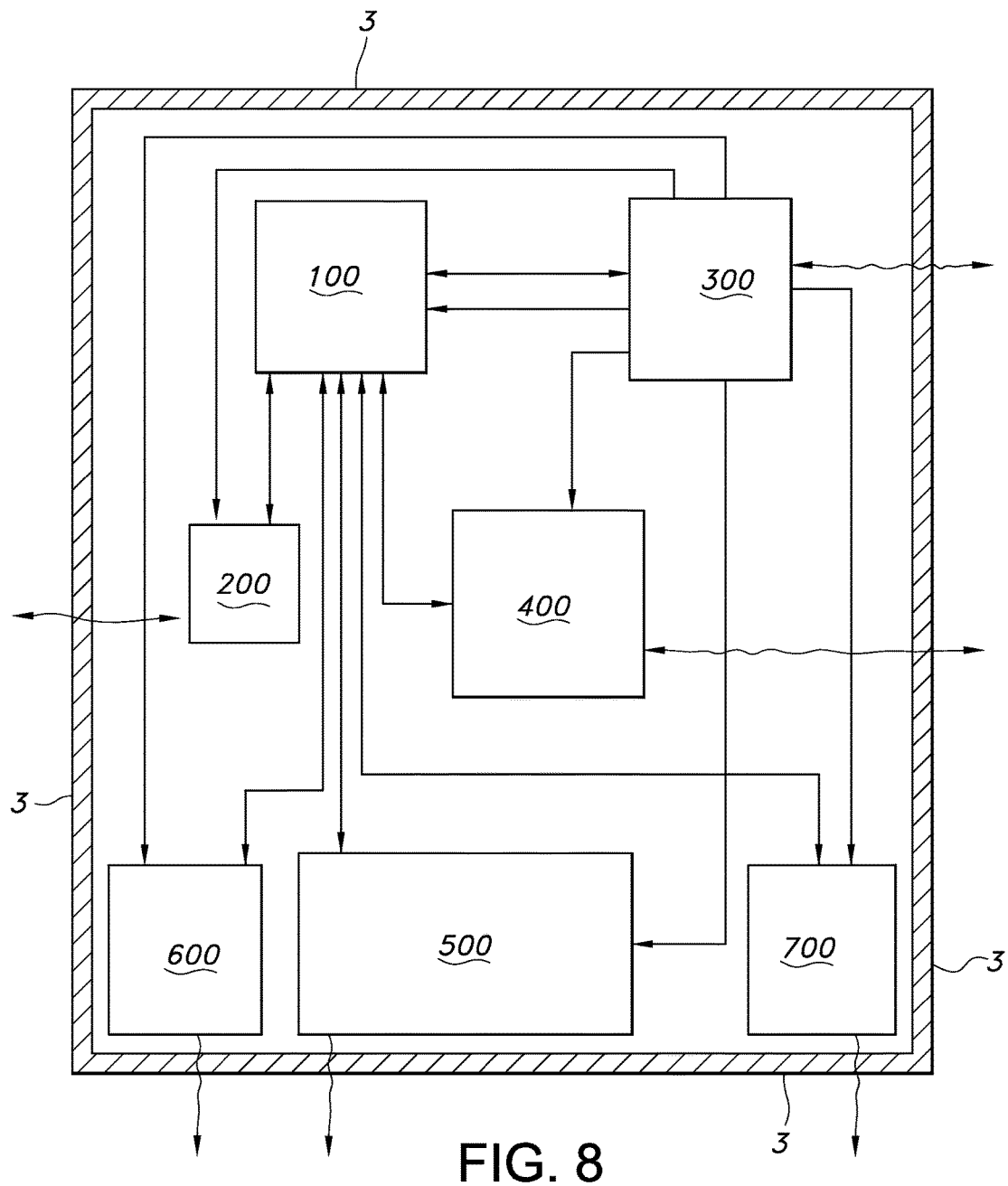
FIG. 8 shows a schematic drawing showing modules that may be present in an element, and the interconnection between modules.

In FIG. 8, a schematic cross section of an element 1 is shown, indicating the various components that may be present in an element 1. In this cross section, four faces 3 are indicated. Element 1 comprises a data processing unit 100, a data communication unit 200, an energy unit 300, a sensor unit 400, a motion-restriction module 600, a motion module 500 and a motion-guiding module 700. Next to these modules other modules may be present: for example an actuator which can move or rotate a retracted motion module within the element 1. The data processing unit 100 may be able to work together with other data processing units 100 of other elements 1 and distribute computational tasks to one another; This may be done in the form of distributed computing or cloud computing.

The waving arrows indicate that the various modules and/or units can interact with the environment outside the element 1. For instance, a sensor unit 400 can measure a physical parameter outside an element 1.

An energy unit 300 may be charged from a source outside element 1. Charging may be wireless, for instance inductive, or using conductive surface patches, for instance.

A data communication unit 200 may transmit data to outside an element 1, or be able to receive data from outside an element 1. This may be data transmitted by another element 1. It may be an element that is in contact with element 1. Data communication may be analogue or digital, be wireless via the electromagnetic spectrum, via sound or via other known wireless data transmission protocols, for instance zigby, bluetooth, WIFI, Near Field Communication (NFC) or the like. Alternatively, data communication may be physically using conductive patches on the surface of the face 3 of an element. Using a sensor like a (digital) camera and analysing data taken by the camera is also a potential form of data communication; known examples are for instance QR-codes or bar-codes. Communication can go across several degrees of distances, even inter-planetary. The energy unit 300 in this embodiment provides energy to components (modules and/or units) in the element 1. This is indicated by single arrows running from the energy unit 300 to the other units and/or modules. An energy unit 300 may be an energy storage unit, for instance a chargeable battery, an accumulator, a capacitor, for instance a super capacitor, or the like. Alternatively, the energy unit 300 may also be a power generator, which generates power. Examples of such an energy unit 300 are a fuel cell, a combustion engine, a photovoltaic element, or similar energy unit 300.

A sensor unit 400 may comprise one or more sensors that are able to detect a physical parameter. Examples of suitable sensors are a temperature sensor, a proximity sensor that detects the presence and/or distance of another element. A pressure sensor, an air-pressure sensor, a light sensor, a location sensor (GPS), a motion detecting sensor, an accelerometer, a moisture sensor, a gyroscope, and the like. Various sensor types that may also be used are also known in the field of robotics.

Examples of possible motion modules, motion-restriction modules, and motion-guiding modules are already described above. These modules as described can be based upon exertion of mechanical forces, or be based upon electromagnetic forces, chemical forces, physical forces, using for instance "van der Waals" forces, "Casimir forces", based upon surface tension, vacuum or air pressure, and the like.

Data processing unit 100 may for instance be a computer having various components known in computers, like memory, an arithmetic processor, data busses, end the like. Data processing unit 100 may be able to control the other parts in the element 1. It may even control at least part of at least one other element. For instance, in a master-slave setting state. It may also coordinate cooperation between elements 1. It may run a computer program. It may process instructions provided from an external source.

The various units or components in FIG. 8 are indicated schematically. The units may be incorporated in the element. In accordance with embodiments, one or more units may at least partially be integrated in a face of an element. Furthermore, In accordance with embodiments, one or more units may at least partially be integrated into a single component. Alternatively, at least part of the functionality of the units 100-700 may be incorporated in the form of a computer program product.

Figure 9A:
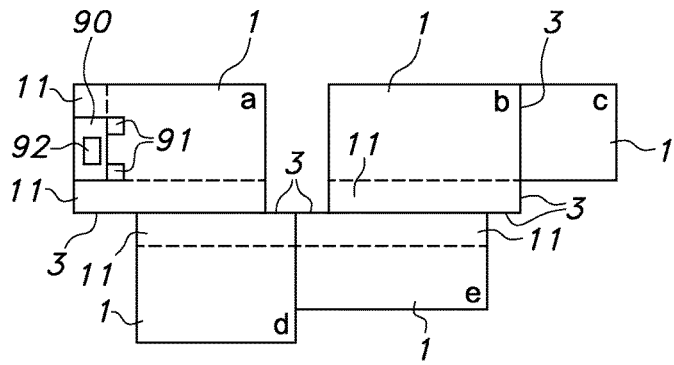
FIGS. 9A-9K Show the use of a separate, shared motion module.

In FIGS. 9A-9K an embodiment of an assembly of elements 1 (labelled 'a'-'e') comprising a shared motion module 90 is illustrated. In the depicted embodiment, the elements do not have the same shape or size. An advantage of a shared motion module is that an assembly of elements can shift shape with the use of a limited number of relatively complex motion modules 90. In FIG. 9A, element 'a' is provided with the shared motion module 90. In accordance with embodiments, shared motion module 90 is temporarily assigned to element 'a'. This may be done by a control structure for assigning the shared motion module, and for controlling the shared motion module 90. Alternatively, the shared motion module 90 is controlled by an element that uses the shared motion module. In yet another embodiment, the shared motion module is self-controlled, of may be part of a peer network together with elements, and even further shared motion modules. The above indicated forms or modes of operation may be combined, or the assembly of elements and one or more shared motion modules may switch from one mode of operation to another. Thus, processing and operation of the motion module may be operated and controlled from the shared motion module 90. Alternatively (and at another end of the spectrum), operation and control of shared motion module 90 is done in an element 1. Operation and processing can also be distributed. Using for instance master-slave settings, control may be switched from element 1 to shared motion module 90 and vice versa. Also, control of a shared motion module may also be switched from one element 1 to another element 1.

Figure 9B:
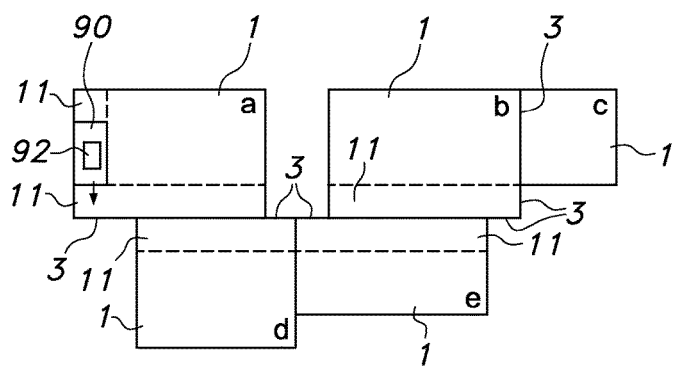
Figure 9C:
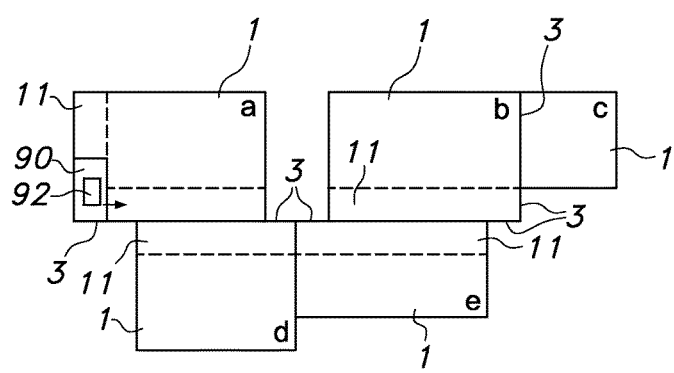
Figure 9D:
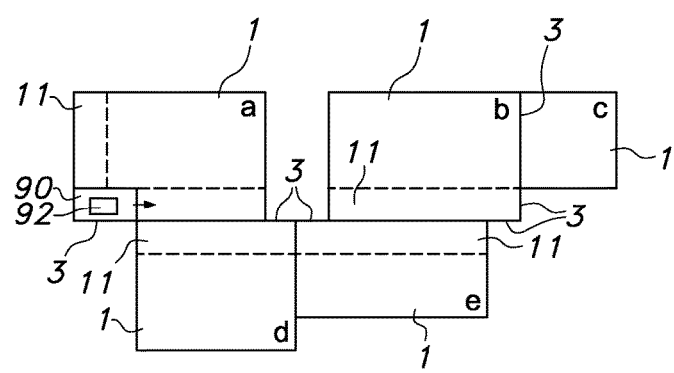
Figure 9E:
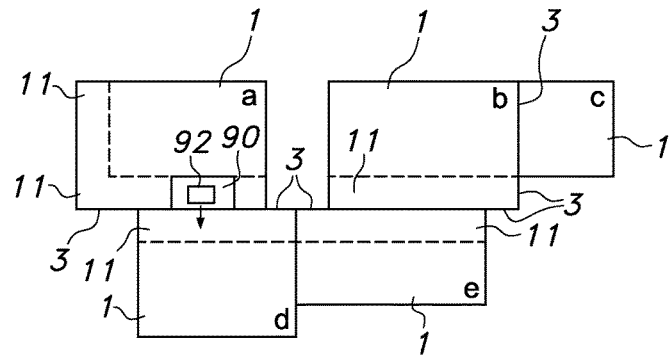
Figure 9F:
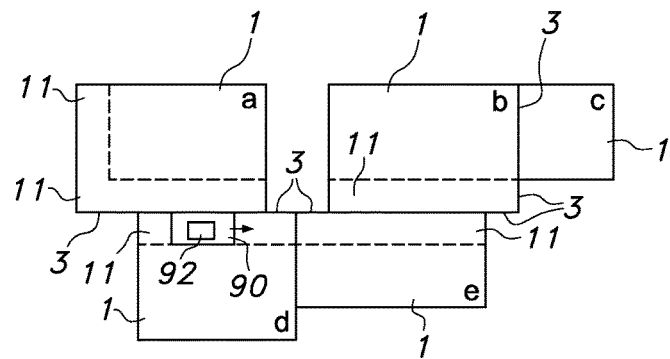
Figure 9G:
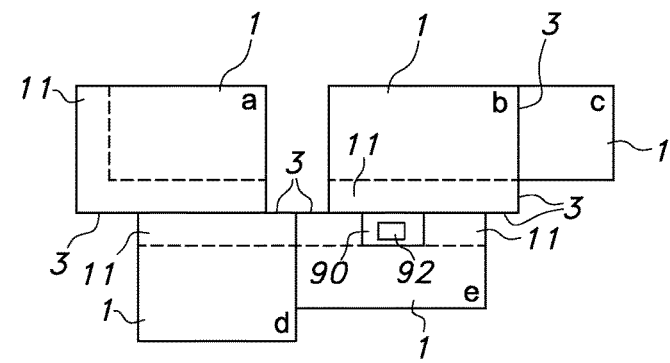

In the current embodiment, the shared motion module 90 comprises attachment parts 91 that engage element 'a'. Shared motion module 90 is in FIG. 9A in its active position. Attachment parts 91 engage element 'a' here in such a way that shared motion module 90 cannot displace with respect to element 'a'. In this active position the shared motion module 90 can be further activated to engage a neighbouring element to start moving element 'a' with respect to such a neighbouring, in particular adjoining, element. Here, no such element is illustrated. The shared motion module 90 is located in a track 11, like for instance a track 11 illustrated in FIG. 4A. In FIG. 9B, the attachment part 91 is pulled in into shared motion module 90. Thus, shared motion module 90 becomes free to move along track 11 of element 'a'. To actually move along track 11 of element 'a', the shared motion module 90 can be provided with a displacement part 92. In accordance with embodiments, displacement part 92 engages in the track 11 of element 'a'. Displacement part 92 may be a mechanical component, physically engaging track 11. For instance, displacement part 92 may comprise driven wheel similar for instance to the motion module of FIGS. 4A-4L, a piezo element illustrated above in a motion module in an element and for instance similar to the embodiments illustrated in FIGS. 6A-7D. Displacement part 92 may also comprise magnet parts that can be activated. The track may be provided with parts that respond to magnetic forces, but that are themselves not permanently magnetic, for instance iron patches. Thus, it is possible to provide a magnetic drive while the elements are themselves not permanently magnetic.

In FIGS. 9B-9G, it is illustrated how displacement part 92 causes shared motion module 90 to travel along tracks 11 of various elements ('a', 'c', 'd') to arrive at an element 1 that is indicated 'e'. When going from FIG. 9C to 9D, the motion module follows track 11, even if the track 11 rounds a corner. When going from FIG. 9E to FIG. 9F, motion module 90 leaves element 'a' and continues its way in track 11 of element 'd'. When going from the situation in FIG. 9F to 9G, motion module 90 first follows track 11 of element 'd', and goes to track 11 of element 'e'. These tracks 11 here connect to one another and for the motion module 90 present one continuous track 11.

Figure 9H:
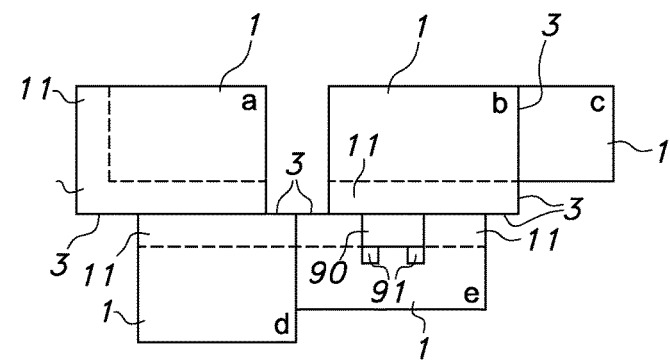

In FIG. 9H, it is illustrated that shared motion module 90 activates its attachment parts 91 to engage element 'e'. Thus, the position of the shared motion module 90 on element 'e' is fixed or locked through attachment part(s) 91. Here, the attachment parts 91 are illustrated at one sided of shared motion module 90. As is evident when looking at FIGS. 9A and 9H, the attachment parts 91 can engage motion module 90 from various sides. Here two sides are illustrated. In accordance with embodiments, the attachment parts 91 are designed to allow engagement of all sides of motion module 90. Alternatively, the attachment parts 91 are not incorporated in the motion module 90 itself, but may be part of the motion module that is integrated in an element. For instance, the attachment part 91 may be designed along the lines of the motion restriction module shown in FIGS. 6A-6D. In fact, it may even be possible to provide a part that is allowed to function as motion restriction module, and as attachment part for motion module 90.

In FIG. 9H the displacement part 92 is not indicated, in order to illustrate that it is no longer functional as of this stage.

In accordance with embodiments, like for instance shown in FIG. 7A, an element 1 comprises two crossing motion guiding modules 11, each motion guiding module 11 going around the element 1. In such an embodiment, two types of shared motion modules may be defined, one type of motion module for a first motion guiding module 11 and another for a second motion guiding module 11. These types of motion modules 90 and motion guiding modules 11 may be identical, but oriented differently.

Figure 9I:
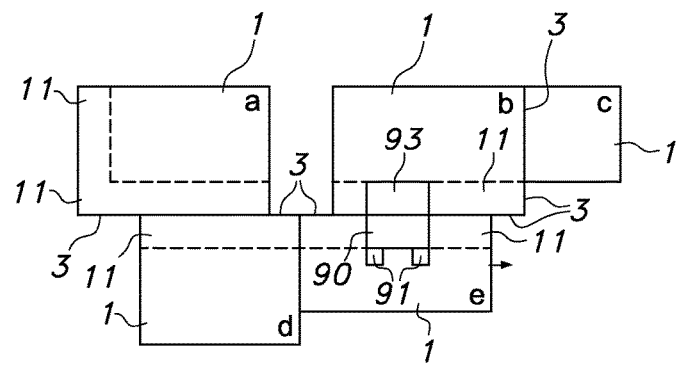
Figure 9J:
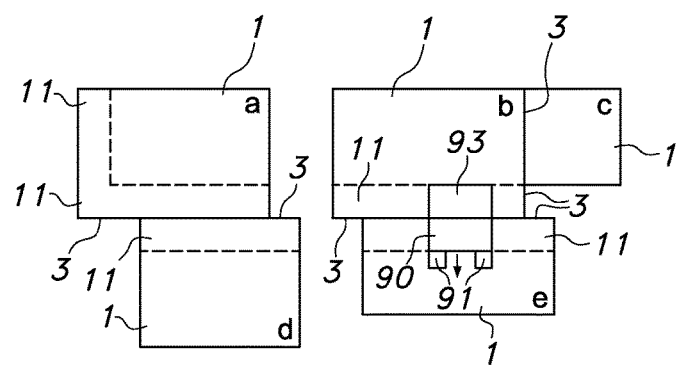
Figure 9K:
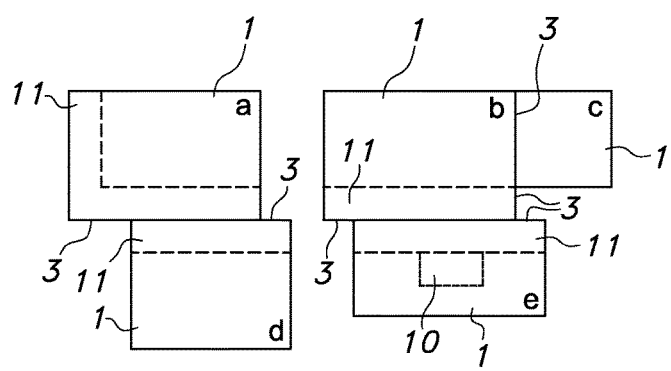

In FIG. 9I, it is illustrated how element displacement part 93 is activated into its active position. The element displacement part 93 extends from shared motion module 90 and from element 'e' into the motion guiding module, here track 11, of element 'b'. Again, the element displacement part 93 can be similar to the types illustrated in FIGS. 4A-7D, i.e., based on mechanical operation, like a wheel, a toothed gear, or the like, magnetically/activated operated elements, or for instance piezo-type elements. The element displacement part 93 now engages into track 11 of element 'b'. It starts exerting force on element 'b' via engagement of track 11. Consequently, element 'd.' displaces with respect to element 'b'. FIG. 9J illustrates this. Next, In accordance with embodiments shown in FIG. 9K, the shared motion module 90 is stored in a storage space in an element, here element 'd.'. Thus, the tracks 11 are free, and shared motion module 90 may be in a position to be charged, or to be protected against environmental influences.

In accordance with embodiments, the displacement part 92 and element displacement part 93 may functionally be combined.

Figure 10A:
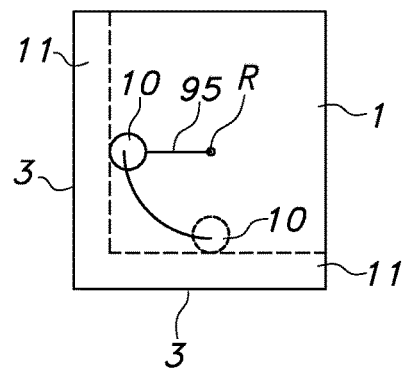
FIGS. 10A-10H show a motion module that can change its orientation inside an element.
Figure 10B:
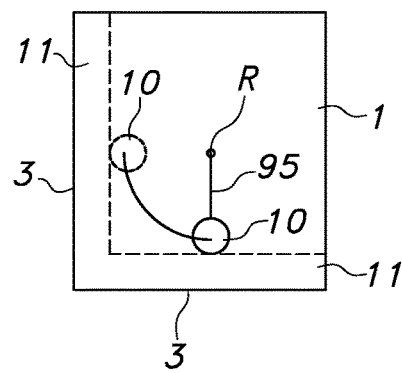
Figure 10C:
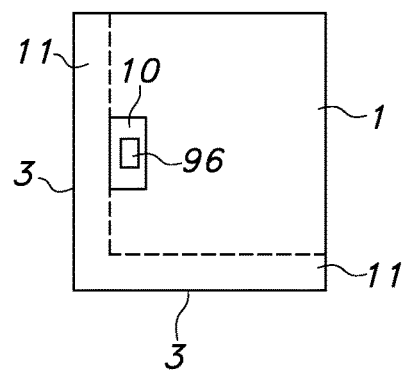
Figure 10D:
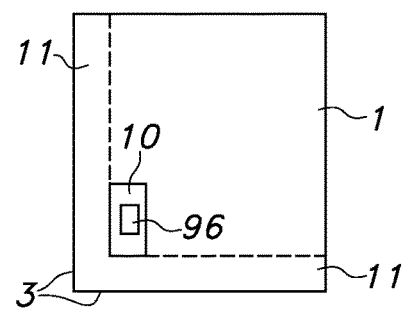
Figure 10E:
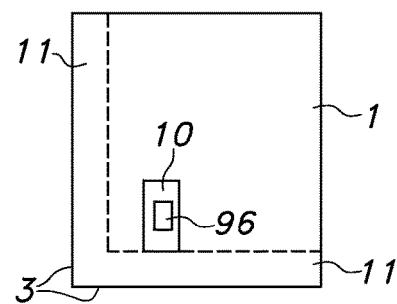

In FIGS. 10A-10H, another concept of an element 1 with a motion module 10 is presented schematically. In this concept, which may be combined with previous concepts, an element 1 has at least one motion module 10 and a motion module movement part 95 allowing displacement or change of orientation of the motion module 10 in an element 1. In this way, the number of motion modules 10 in an element 1 can be considerably reduced. In accordance with embodiments, an element 1 comprises one motion module 10 that comprises a motion module movement part 95 that allows a motion module to be displaced or repositioned to have an active position at each face 3. Thus, only one motion module 10 can be sufficient of displacing an element 1 with respect to another element 1. In fact, more than one motion module 10 may be included in an element 1. In FIGS. 10A and 10B, an embodiment of such a motion module 10 is illustrated that comprises a motion module movement part 95 that allows rotation of the motion module 10 inside the element 1. In that way, motion module 1 that is at an active position at a face 3, allowing engagement of an adjoining element (not shown) that rests against the surface of face 3. In FIG. 10B, motion module 10 is rotated about rotation axis R to an active position at the adjacent face 3 of element 1.

In FIGS. 10C-10H, an alternative embodiment for the motion module 10 with an alternative motion module movement part 96 is illustrated. In this embodiment, motion module 10 moves parallel to motion guiding module 11. It is within motion guiding module 11. Motion module 10 in this embodiment comprises a motion module movement part 96 that allows displacement of motion module 10 as indicated in subsequent FIGS. 10C-10G. The motion module 10 moves or displaces from its position in FIG. 10C to its position in FIG. 10D parallel to motion guiding module 11, here track 11. Motion module 10 here displaces inside element 1. Here motion module 10 moves or displaces between the centre point of the element and track 11, leaving track 11 free. The motion module may be actuated via exertion of a mechanical force. Examples are illustrated above. Alternatively, electromagnetical force may be used. An example of this is also illustrated above. In this way, an element may comprise as little as one motion module 10, reducing complexity o an element. It may be possible to equip an element 1 with several motion modules.

Figure 10F:
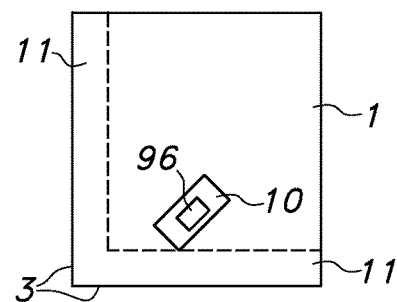

In FIG. 10F, motion module 10 is moved to come into its working position. In this embodiment, the motion module has a working position. In other embodiments, the motion module may be designed to move in more than one orientation.

Figure 10G:
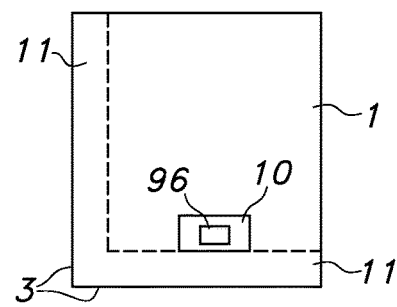
Figure 10H:
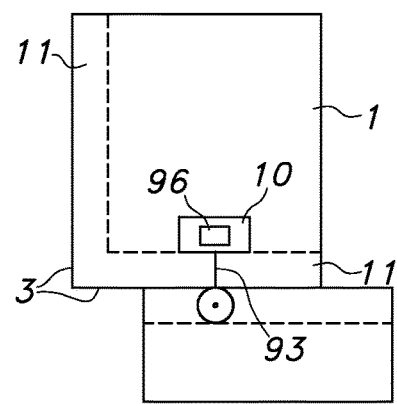

In FIG. 10G, motion module 10 is at its new active position at adjacent face 3. There, motion module 10 may be locked in its position in element 1. In FIG. 10H, schematically, motion module 10 released an element displacement part 93. In this embodiment, it may comprise a driven wheel, like the embodiment of FIGS. 4A-4L. Other element displacement parts 93 may also be conceivable, for instance the piezo element described above, or the magnetic parts described earlier. This embodiment may considerably simplify elements 1, as the may comprise as little as one motion module 10 in an element 1. The motion module may comprise part of the elements functional parts. In one extreme example, the motion module 10 comprises all the functional parts (FIG. 8) of the element 1.

The embodiment of FIGS. 10A-10H may be combined with the embodiment of FIGS. 9A-9K. For instance, an element may comprise one or more internally displaceable motion modules 10, in combination with one ore more shared motion modules in an object. In an other embodiment, a motion module can be both an internal motion module, and it may function as a shared motion module 10.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of embodiments and are obvious combinations of prior art techniques and the disclosure of this patent.

LISTING OF REFERENCE NUMERALS 1 element
2 centre of an element
3 face of an element
10 motion module
11 motion module
12 slidable cover
14 motion guiding/motion restriction module
15 motion guiding/motion restriction module
20 motion guiding module
21 straight pin
22 groove
30 motion restriction module
31 pin
32 slot
34 cam
35 undercut opening in slot 3 . . .
70 piezo module
71 leg
72 piezo piece
73 piezo element
80 rail
82 undercut groove
90 (shared) motion module
91 Attachment part(s)
92 displacement part
93 element displacement part
95 motion module movement part
96 motion module movement part
100 data processing unit
200 data communication unit
300 energy unit
400 sensor unit
500 motion module
600 motion restriction unit
700 motion guiding module

What is claimed is:

1. A computer implemented construction tool, comprising:
   a processor;
   a set of elements having a geometric shape, each element in the set having:
      a centre point,
      a relative position,
      at least one face coupled to said centre point,
      an orientation,
      a motion-guiding function, coupled to said centre point and defining a trajectory over said element,
      a motion-restriction function to limit the displacement of said centre point with respect to a second centre point of said of the elements to at least one trajectory selected from said trajectory and a second trajectory of said another element,
      a function including at least one sensor to provide input regarding the presence of said another element in contact with at least one face of said element for allowing displacement of said element based upon said input regarding said presence, and
      an element computer program operationally coupling said motion-guiding function, said motion-restriction function and said at least one sensor,
   an initial state including positions of said elements and allowing displacement of at least one element; and
   a goal state, different from said initial state and requiring displacement of at least one element,
   a computer program including instructions which, when executed by the processor, is to define in a memory said set of elements, said initial state, and said goal state,
   wherein:
      said set of elements further includes a motion function providing one or more of the elements with an independent ability to move, thereby defining a displacement of the centre point of the element with respect to said second centre point of said another element using the motion-guiding function of said another element, and
      said motion-guiding function of at least two of said elements define a functional coupling between elements to enable said motion function to displace the centre point of a third, displacing element which has a face in contact with a face of one of the at least two elements, said displacing displaces said third element away from the centre point of one of the at least two elements and towards the centre point and in contact with the other of the at least two elements,
      said element computer program, when executed, is to allow displacement of said element when further functionally coupling said motion function, said element computer program basing at least part of its decision-making regarding displacement of said element to said goal state on a factor of randomness, said factor of randomness including a random generator that influences a selection of a direction of motion.

2. The computer-implemented construction tool of claim 1, wherein said construction tool is part of a game.

3. The computer-implemented construction tool of claim 1, further comprising defining a function toolbox comprising a set of said motion-guiding functions, a set of said motion functions, a set of said motion-restriction functions and a set of said functions comprising at least one sensor, presenting said function toolbox to a user, enabling said user to select at least one function from said function toolbox for each element, and transferring said at least one selected function to said element computer program.

4. The computer-implemented construction tool of claim 1, wherein said elements are physical elements.

5. The computer-implemented construction tool of claim 1, wherein said construction tool is part of a game, the game providing a set of parameters which together with said goal state determine winning or losing said game.

6. The computer-implemented construction tool of claim 1, wherein said goal state is defined in a building plan, and wherein at least one element can be provided with at least part of said building plan.

7. The computer-implemented construction tool of claim 6, wherein said building plan is distributed over said elements, and said elements can exchange at least part of said building plan.

8. A method for playing a game or running a simulation, comprising:
providing a computer program which, when running on a computer device, performs:
defining, in a memory, a set of elements having a geometric shape, each element having a centre point and at least one face;
defining, in the memory, an initial state of said set of elements, an initial outer boundary of said set of elements, and at least a position of each element with respect to said initial outer boundary; and
defining, in the memory, a goal state of said set of elements, which goal state is different from said initial state and requiring displacement of at least one element;
providing a function toolbox that includes:
a set of motion-guiding functions, said motion-guiding functions coupled to said centre point and defining a trajectory over other said elements;
a set of motion functions defining a displacement of the centre point with respect to a second centre point of one of the other elements using the motion-guiding module of that other element, wherein said motion function allows one or more of the elements with its own movement ability defining the displacement of the centre point with respect to the second centre point of one of the other elements using the motion-guiding module of that other element;
a set of motion-restriction functions, adapted to limit the displacement of said centre point with respect to said second centre point to at least one trajectory selected from said trajectory and a second trajectory of said other element; and
a set of sensor functions comprising a sensor function to provide input regarding the presence of another of the elements in contact with at least one face of said element for allowing displacement of said element based upon said input regarding said presence;
presenting said function toolbox to a user and enabling said user to select at least one function from said function toolbox for each element;
providing for each element an element computer program operationally coupling said selected function, and which element computer program when executed performs steps which allows displacement of an element based upon said contact input;
basing decision-making of said element computer program at least part regarding its displacement to the goal state on a factor of randomness, said factor of randomness including a random generator to influence a selection of a direction of motion of said element; and
executing, for each element, said element computer program.

9. The method of claim 8, comprising providing input regarding the presence of another element in contact with at least one face.

10. The method of claim 8, comprising defining, in the memory, a goal state of said set of elements by an end outer boundary of said set of elements.

11. The method of claim 8, comprising defining, in the memory, a goal state of said set of elements by defining for at least one element a requirement with respect to said set of elements.

12. The method for playing the game of claim 8, comprising defining, in the memory, a goal state of said set of elements by defining for at least one element a requirement with respect to at least one element of said set of elements.

13. The method of claim 8, comprising defining, in the memory, a goal state of said set of elements by defining for at least one element a requirement with respect to at least one specific element of said set of elements.

14. The method of claim 8, wherein said set of sensor functions further comprise a sensor to sense the relative position and orientation of said element with respect to at least one other, element, and provide information on a spatial position of said element, and thereby permit displacement of said element further based on the sensed relative position and orientation.

15. The method of claim 12, wherein said element computer program basing at least part of its decision-making regarding its displacement to the goal state on a factor of randomness.

16. A method of playing a game, comprising:
shape-shifting a set of elements from an initial first shape to a predefined second shape, by displacing at least one element with respect to at least one other of said elements in order to change a position of the at least one element,
providing a function toolbox that includes:
a set of motion-guiding functions, said motion-guiding functions coupled to said centre point and defining a trajectory over other said elements;
a set of motion functions defining a displacement of the centre point with respect to a second centre point of one of the other elements using the motion-guiding module of that other element, wherein said motion function allows one or more of the elements with its own movement ability defining the displacement of the centre point with respect to a second centre point of one of the other elements using the motion-guiding module of that other element;
a set of motion-restriction functions, adapted to limit the displacement of said centre point with respect to said second centre point to at least one trajectory selected from said trajectory and a second trajectory of said other element; and
set of sensor functions to provide input regarding the presence of another of the elements in contact with at least one face of said element for allowing displacement of said element based upon said input regarding said presence;
wherein each element also includes a computer program operationally coupling said selected functions, and which computer program, when executed, performs steps allowing input selected from the sensor modules, and allowing displacement of an element executing said computer program,
wherein the computer program bases at least part of its decision-making regarding its displacement to the predefined second shape on a factor of randomness.

17. The method of claim 16, wherein said set of sensor functions further comprise a sensor to sense the relative position and orientation of said element with respect to at least one other, element, and provide information on a spatial position of said element, and thereby permit displacement of said element based on the sensed relative position and orientation.

18. A method for playing a game, comprising:
providing an initial shape of a set of elements having a cube shape to a user playing said game;
providing an end shape that includes said elements by displacing, using a motion module for at least one element, at least one element in relation to the other elements, wherein said end shape is different than the initial shape;
providing a set of parameters which together with said end shape determine losing or winning said game;
providing the user with a set of tools, wherein the user may select programmable attributes of the elements by which each element is able to execute a corresponding element computer program for that element, independently regarding displacement of the element between said initial shape and said end shape, in which decision-making of said element computer program is based at least part on a factor of randomness, said factor of randomness including a random generator to influence a selection of a direction of motion of said element;
allowing the user to make a selection from said set of tools;
transferring the selected tools selected by the user to said elements;
starting the game, wherein said elements run their respective programs starting from said initial shape; and
completing the game on a basis of said parameters and a position of said elements in relation to said end shape.

19. The method of claim 18, wherein said game comprises a computer game.

20. The method of claim 18, wherein said programmable attributes comprise at least one selected from the group consisting of sensor attribute, communication attribute, energy attribute, motion attribute, motion restriction attribute, motion guiding attribute, program attribute.

21. The method of claim 18, wherein said own program comprises at least one selected from the group consisting of an element of randomization, a learning algorithm, and an artificial intelligence element.

22. The method of claim 18, wherein part of said respective program makes use of one selected from the group consisting of randomization, probabilities, a feedback loop, a learning curve, a problem generator, a performance element, a world model made up out of the environment and the world state available in said own program.

* * * * *